(12) United States Patent
Caris

(10) Patent No.: US 11,306,916 B2
(45) Date of Patent: Apr. 19, 2022

(54) PLASTIC-POWERED POWER GENERATOR

(71) Applicant: Daniel Caris, Merced, CA (US)

(72) Inventor: Daniel Caris, Merced, CA (US)

( * ) Notice: Subject to any disclaimer, the term of this patent is extended or adjusted under 35 U.S.C. 154(b) by 240 days.

(21) Appl. No.: 16/859,580

(22) Filed: Apr. 27, 2020

(65) Prior Publication Data

US 2021/0293409 A1  Sep. 23, 2021

Related U.S. Application Data

(60) Provisional application No. 62/991,438, filed on Mar. 18, 2020.

(51) Int. Cl.
| | | |
|---|---|---|
| *F23G 5/46* | (2006.01) | |
| *F23G 7/12* | (2006.01) | |
| *F01K 21/00* | (2006.01) | |
| *F01K 11/02* | (2006.01) | |

(52) U.S. Cl.
CPC ............... *F23G 5/46* (2013.01); *F01K 11/02* (2013.01); *F01K 21/00* (2013.01); *F23G 7/12* (2013.01); *F23G 2206/203* (2013.01)

(58) Field of Classification Search
CPC ........ F23G 5/46; F23G 7/12; F23G 2206/203; F01K 11/02; F01K 21/00
See application file for complete search history.

(56) References Cited

U.S. PATENT DOCUMENTS

| | | | |
|---|---|---|---|
| 4,633,819 A * | 1/1987 | Tilliette ................ | F22B 1/066 165/142 |
| 8,202,918 B2 | 6/2012 | Azulay et al. | |
| 8,833,276 B2 | 9/2014 | Bang et al. | |
| 9,044,761 B2 | 6/2015 | Fuse | |
| 9,387,640 B1 | 7/2016 | Rice | |
| 9,404,042 B2 | 8/2016 | Schulz | |
| 9,404,046 B2 | 8/2016 | Sarker | |
| 2007/0256426 A1 * | 11/2007 | Dooley ................ | F02P 3/0807 60/776 |

FOREIGN PATENT DOCUMENTS

| | | | |
|---|---|---|---|
| JP | 2003-327978 A | | 11/2003 |
| JP | 2003327978 A | * | 11/2003 |
| WO | 2009-081434 A2 | | 1/2009 |

OTHER PUBLICATIONS

English Translation JP 2003 327978A (Year: 2003).*

* cited by examiner

*Primary Examiner* — Shafiq Mian
(74) *Attorney, Agent, or Firm* — Procopio Cory Hargreaves and Savitch LLP

(57) ABSTRACT

Plastic-powered power generator. In an embodiment, the plastic-powered power generator comprises a primary reactor with an air-fuel distribution assembly configured to supply fluidized polymer, air, and oxidizer to a primary reactor chamber, and an ignition system configured to ignite a mixture of the fluidized polymer, air, and oxidizer. The primary reactor chamber extends into a secondary reactor, to, when ignited, heat air flowing through the secondary reactor from a blower to a heat exchanger. The heated air flow converts fluid, in a coil within the heat exchanger, into steam, which can drive a turbine to generate electrical power.

20 Claims, 28 Drawing Sheets

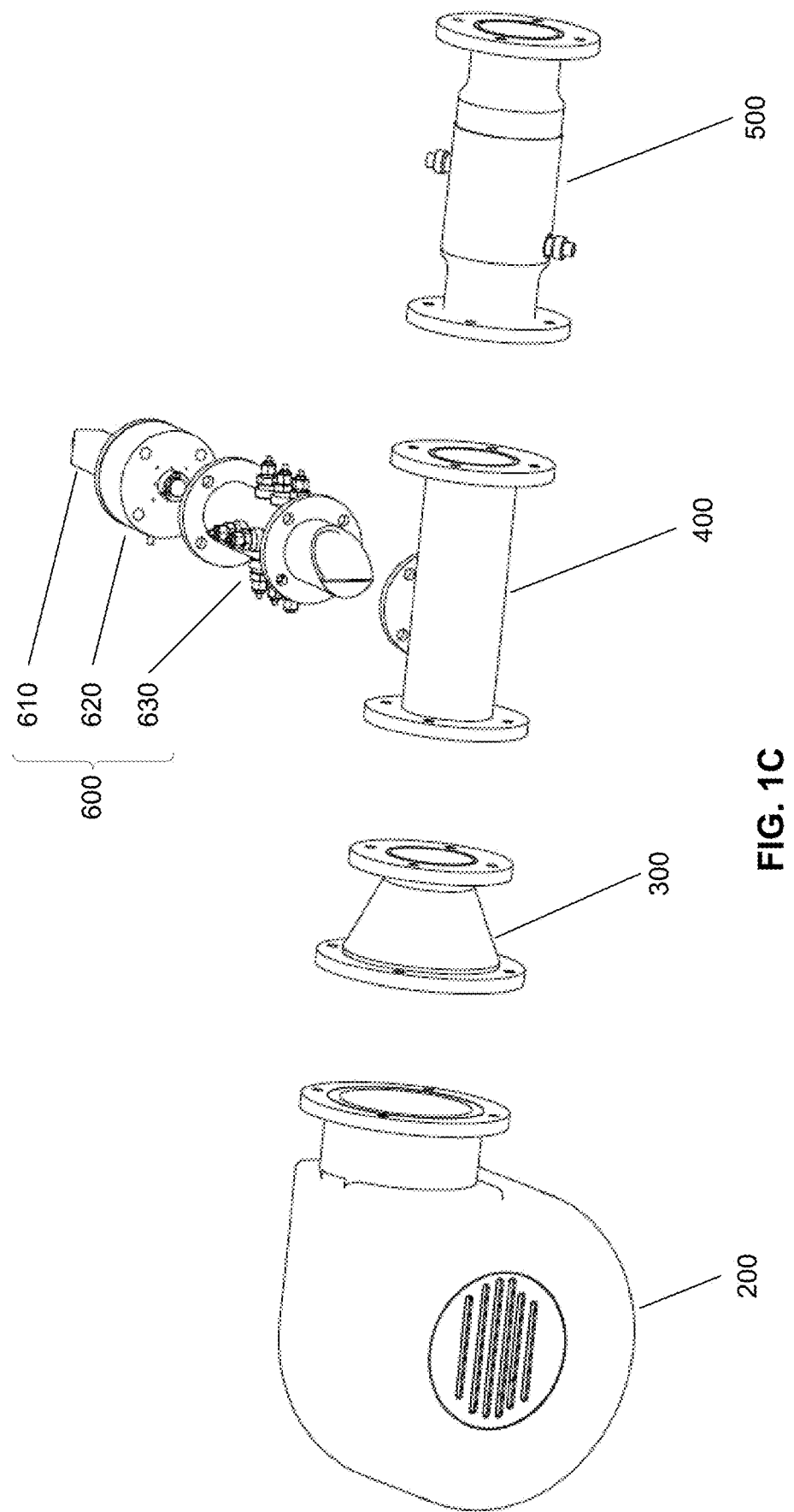

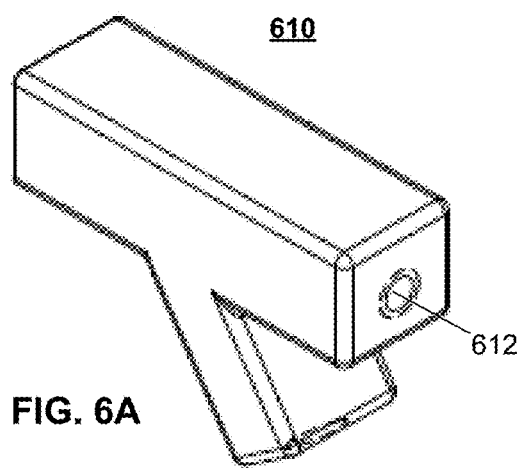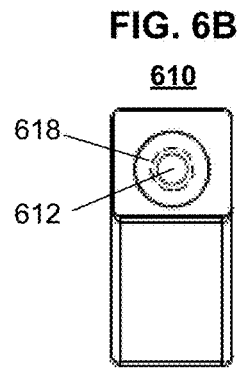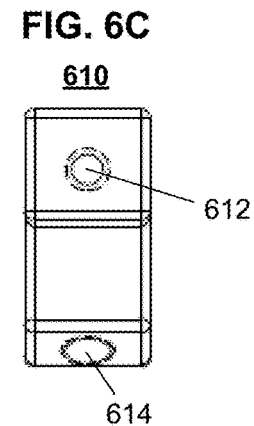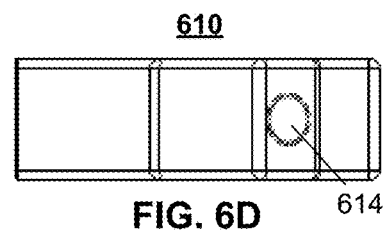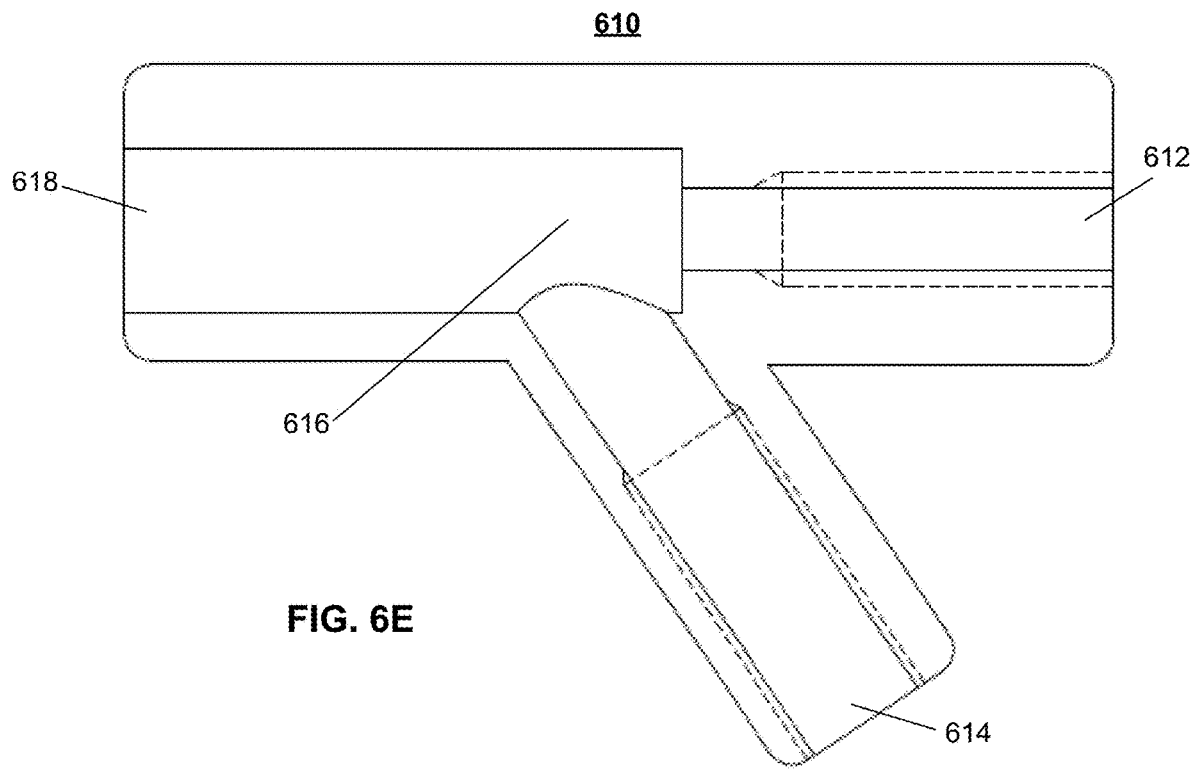

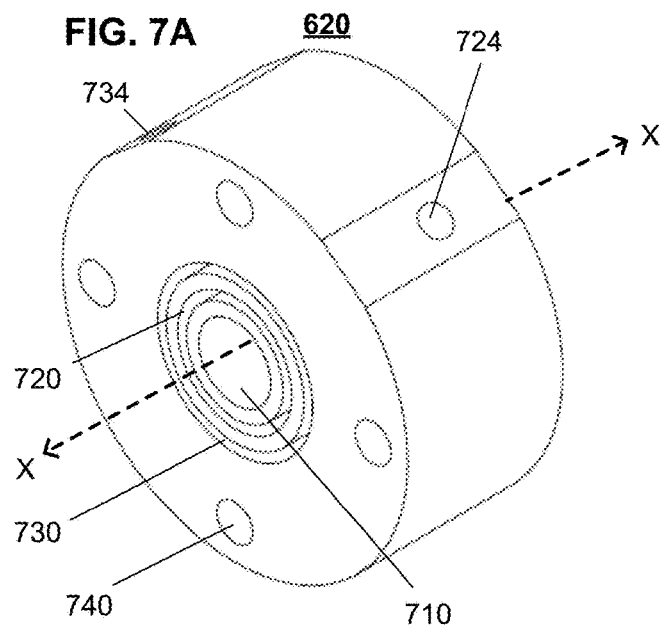
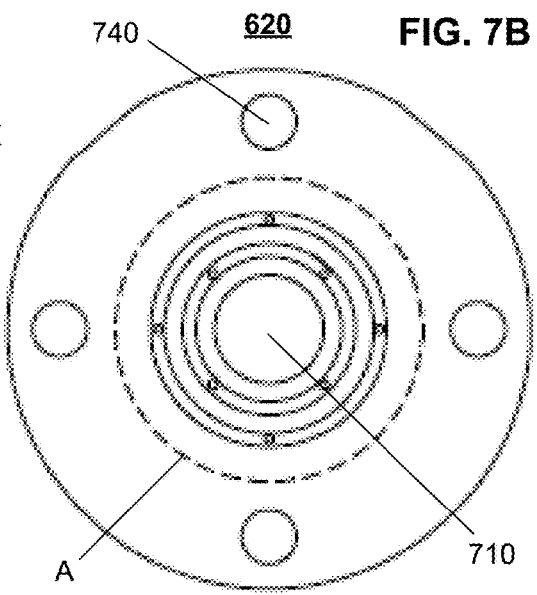
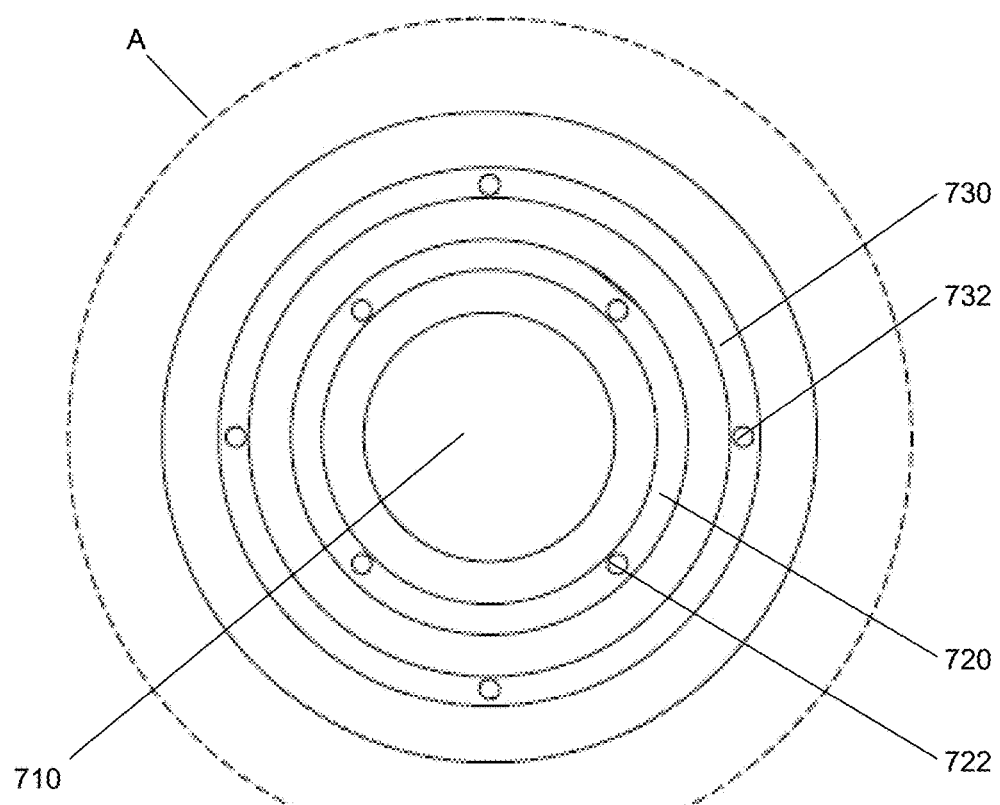
FIG. 7A
FIG. 7B
FIG. 7C

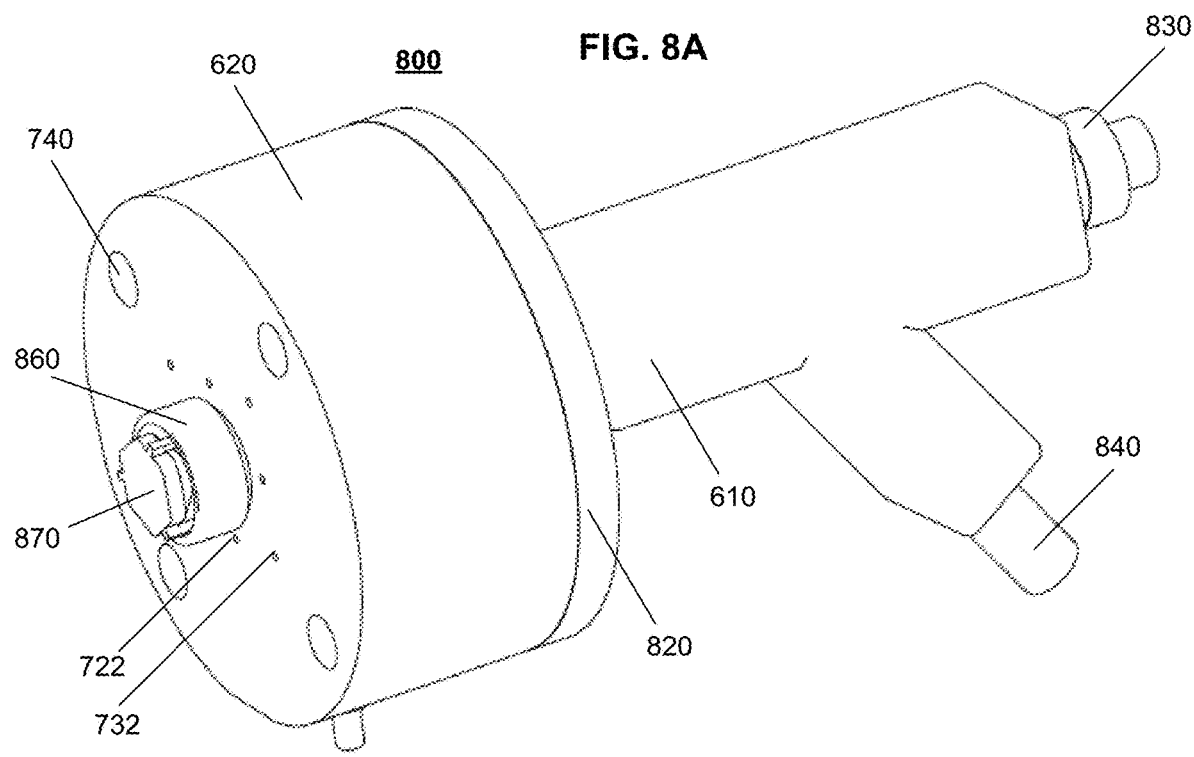
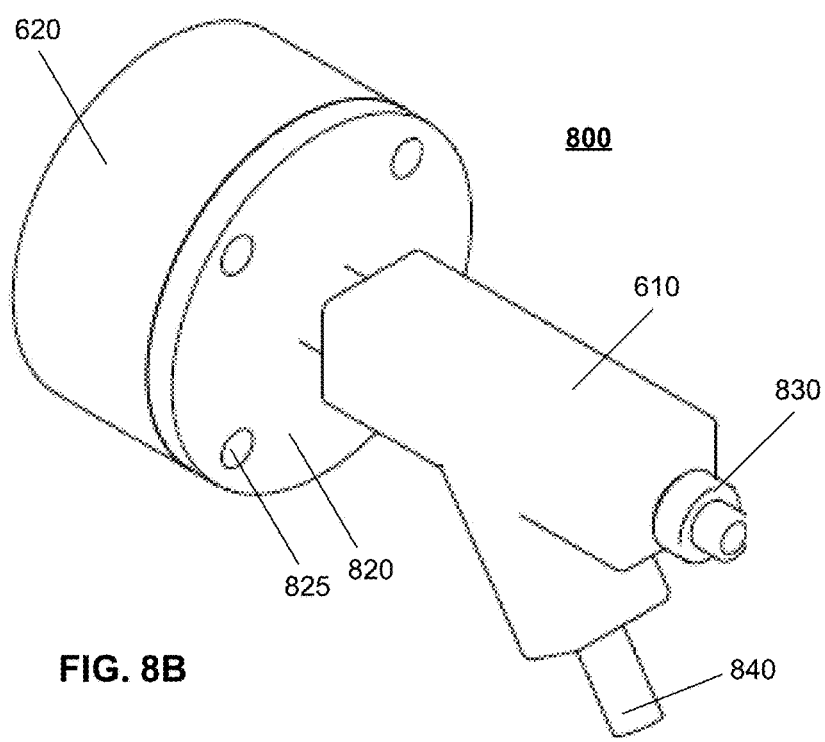

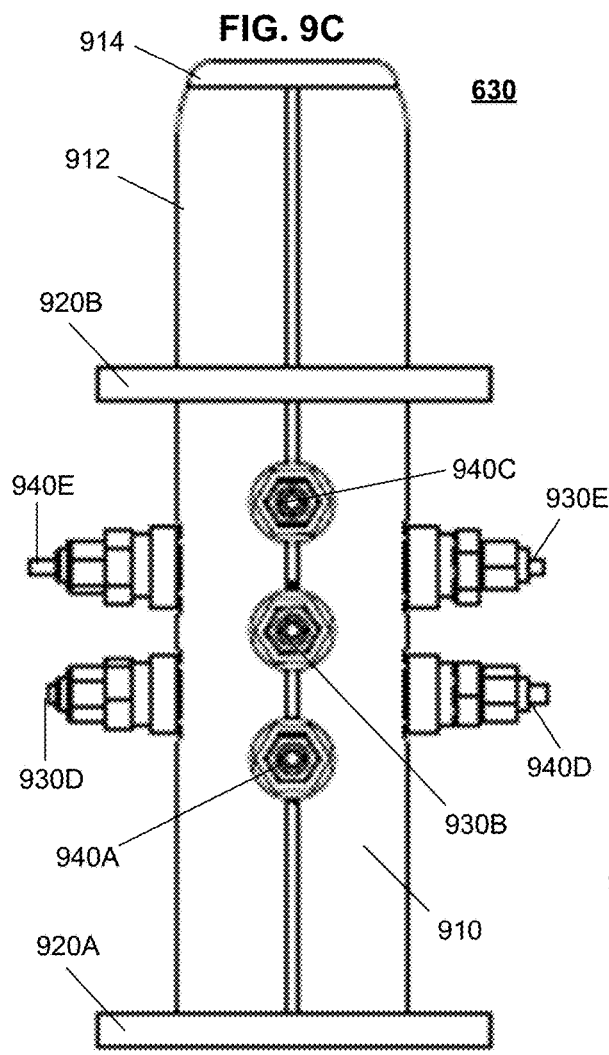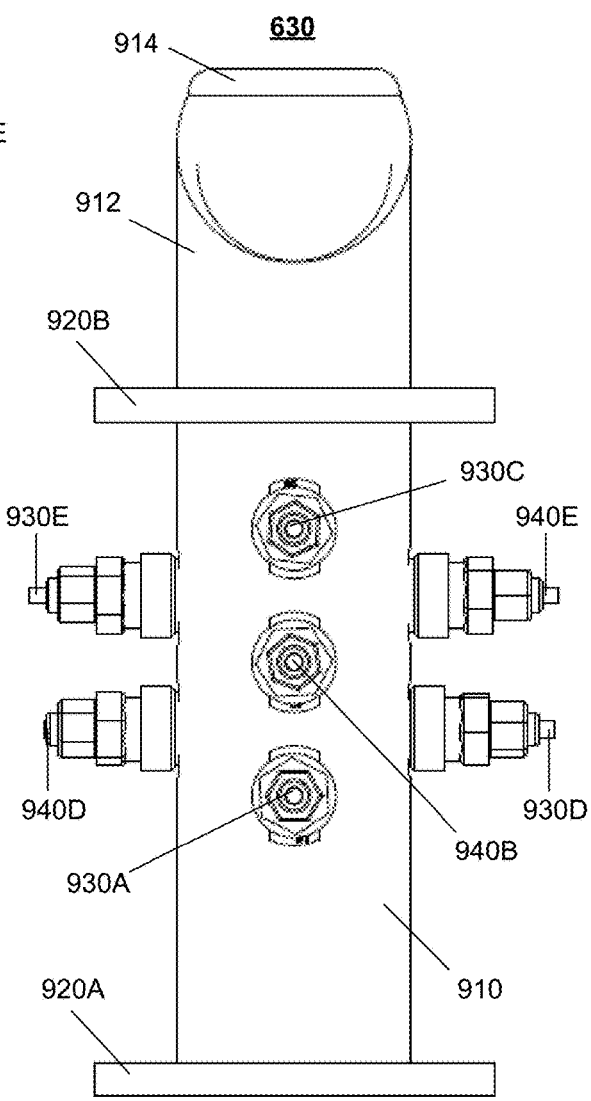

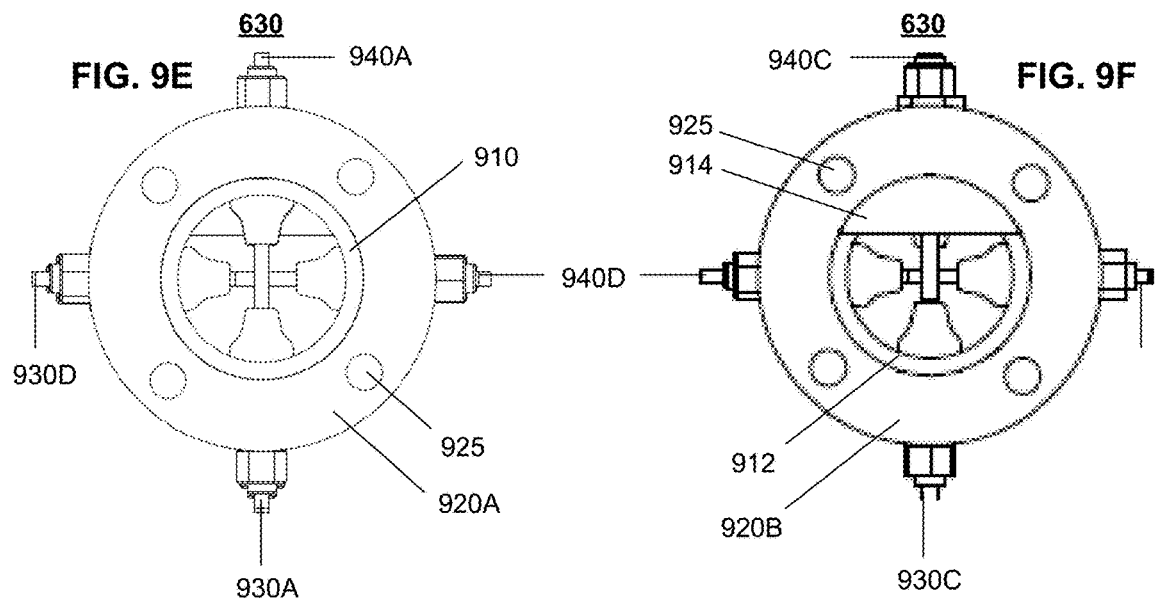
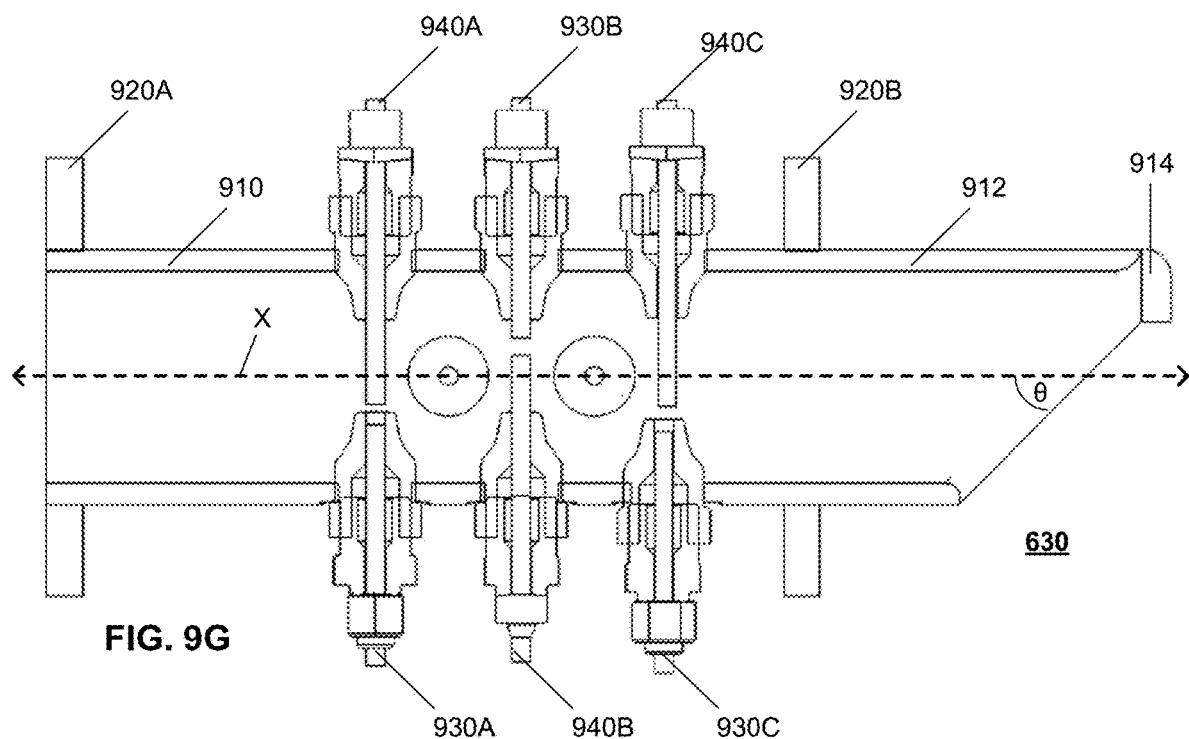

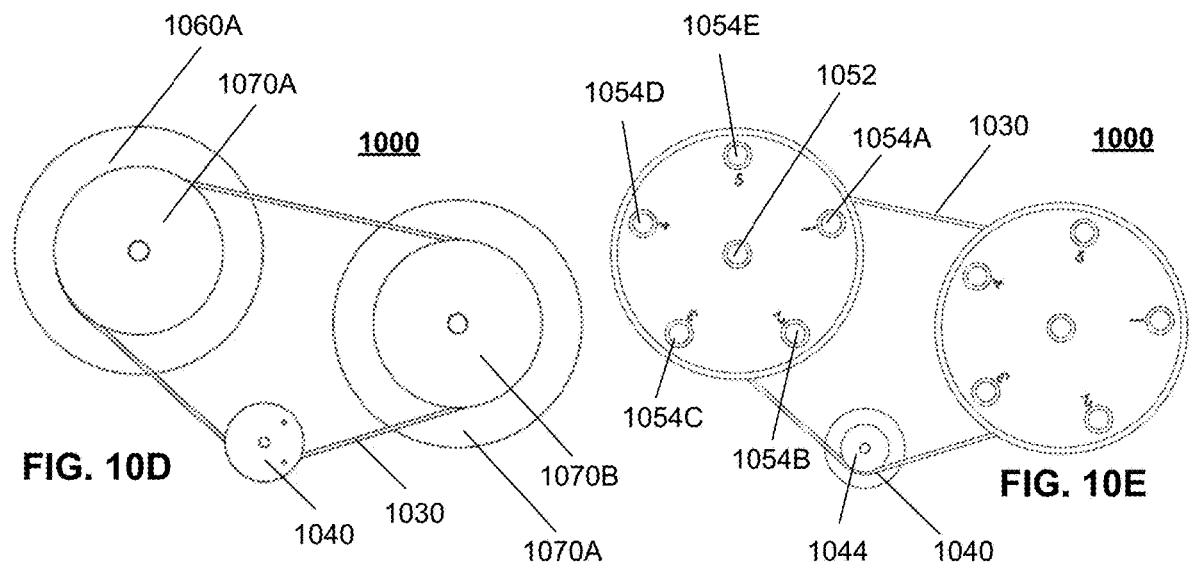
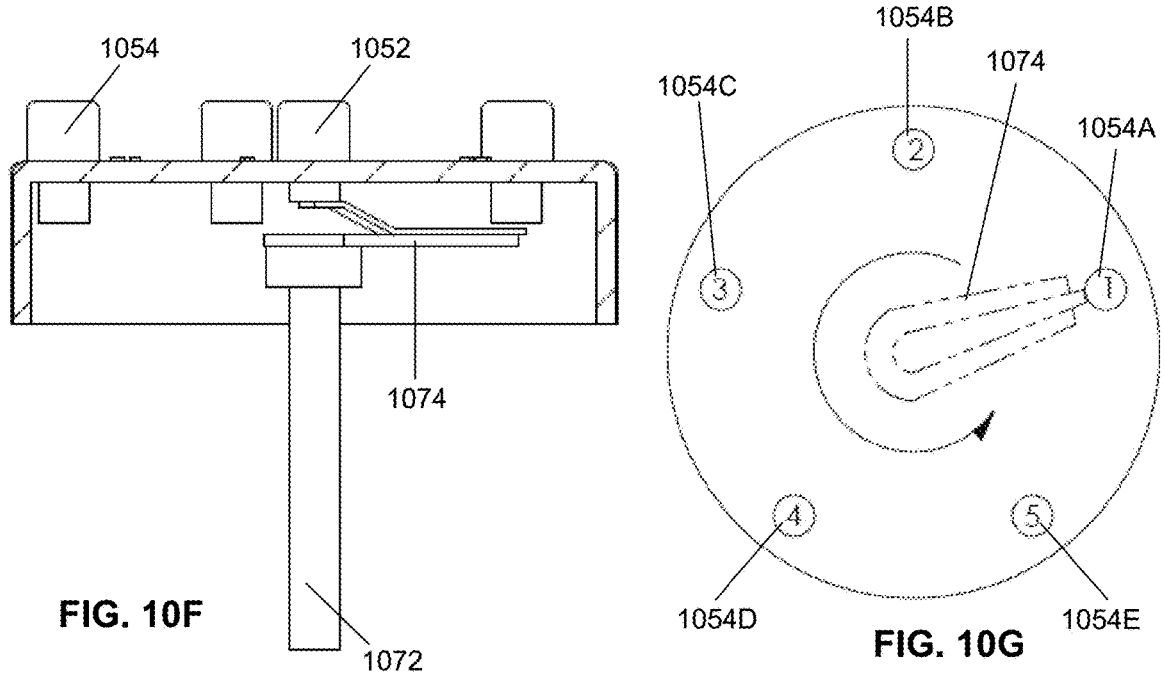

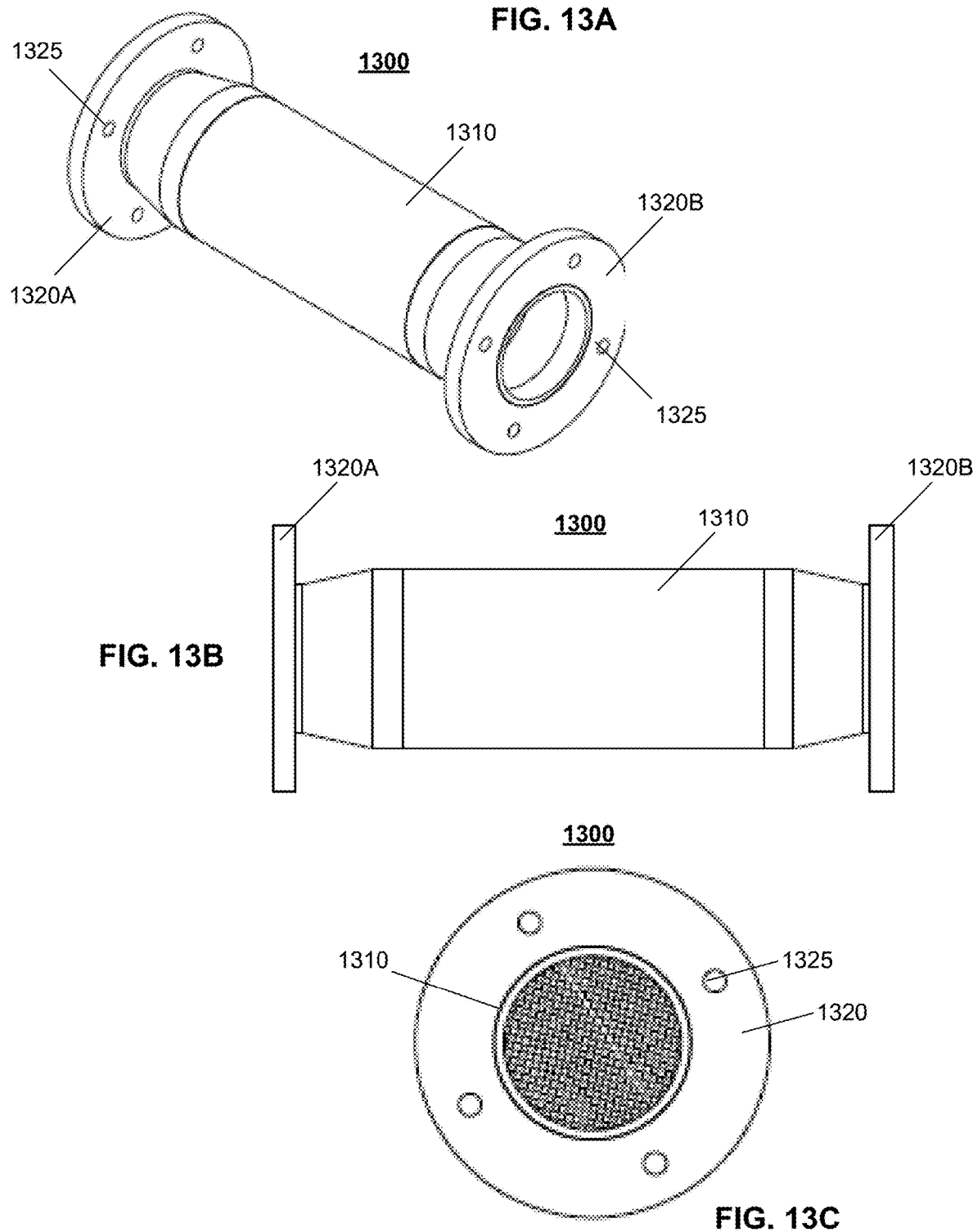

PLASTIC-POWERED POWER GENERATOR

CROSS-REFERENCE TO RELATED APPLICATIONS

This application claims priority to U.S. Provisional Patent App. No. 62/991,438, filed on Mar. 18, 2020, which is hereby incorporated herein by reference as if set forth in full.

BACKGROUND

Field of the Invention

The embodiments described herein are generally directed to waste disposal, and, more particularly, to a waste disposal process that converts plastic waste into electricity using an electrochemical, thermal, and/or mechanical reactor, referred to herein as a plastic-powered power generator (PPG).

Description of the Related Art

Plastics play an important role in modern industrial society. Plastics can be found in packaging materials, heat-insulating materials, components of electrical and electronic devices, automobile parts, automobile interiors, and the like. In 2015, a study by the National Geographic Society estimated that humans had produced 6.3 billion metric tons of plastic waste since the early 1950's. Only 9% of this plastic waste had been recycled. The amount of plastic waste production has only continued to increase, as the consumption of plastics continues to increase.

Plastics have excellent corrosion resistance, chemical resistance, durability, and the like. While this makes them very useful for parts and products, it also means that plastics do not easily decompose in their natural state. This has a devastating effect on the environment. For example, marine life has been adversely affected by plastic waste, and especially by the micro-plastics that are generated from larger plastics. For example, plastic waste has decreased the number of plankton. However, not only does plastic waste affect marine life, it also affects human and other animal life, since a large amount of food is sourced from the ocean.

Because of the toxic nature of plastic waste and polymers, much effort has been directed to the problem of recycling plastics and using recycled plastics. One method of disposing of plastic waste uses fuel, such as natural gas, to burn the plastic waste. However, this method produces excessive pollutants, is not cost-effective, and requires high temperatures in order to consume the plastic waste. Another method involves complicated and expensive chemical processes.

SUMMARY

Accordingly, a plastic-powered power generator is disclosed that utilizes plastic waste as fuel to generate power. The plastic-powered power generator may comprise an electrochemical, thermal, and/or mechanical system that conveys heat from processed plastic waste to an inline heat exchanger. The plastic power generator may utilize micro-pulverized plastic to create thermal energy, and extract that thermal energy to turn a steam turbine that produces electricity.

In an embodiment, a plastic-powered power generator is disclosed that comprises: a primary reactor comprising an air-fuel distribution assembly, an ignition system, and a primary reactor chamber, wherein the primary reactor chamber comprises a first opening on one end of the primary reactor chamber and a second opening on a second end of the primary reactor chamber, wherein the air-fuel distribution assembly is configured to supply fluidized polymer, air, and an oxidizing agent through the first opening in the primary reactor chamber, and wherein the ignition system is configured to ignite a mixture of the fluidized polymer, air, and oxidizing agent within the primary reactor chamber; a secondary reactor comprising a secondary reactor body with a first opening on one end of the secondary reactor body, a second opening on a second end of the secondary reactor body, and a third opening on a side of the secondary reactor body, wherein the second end of the primary reactor chamber extends through the third opening in the side of the secondary reactor body, such that the second opening of the primary reactor chamber is within the secondary reactor body; a heat exchanger comprising a first opening on one end of the heat exchanger, a second opening on a second end of the heat exchanger, and a coil, configured to contain fluid, between the first opening and the second opening, wherein the first opening of the heat exchanger is connected to the second opening of the secondary reactor; and a blower configured to create air flow through the secondary reactor into the heat exchanger, such that the air flow is heated in the secondary reactor through the second opening of the primary reactor, and the heated air flow from the secondary reactor heats the coil in the heat exchanger. The plastic-powered power generator may further comprise a reducer positioned between the blower and the secondary reactor, wherein the reducer is configured to speed up the air flow into the secondary reactor.

The second opening of the primary reactor chamber may be angled with respect to a longitudinal axis of the primary reactor chamber, such that the second end of the primary reactor chamber extends farther into the secondary reactor at a side nearer the blower than at a side farther from the blower. The second end of the primary reactor chamber may comprise a lip which extends over a portion of the second opening of the primary reactor chamber.

The air-fuel distribution assembly may comprise an air-oxidizer manifold that comprises: a dispersal port comprising a channel from a rear surface of the air-oxidizer manifold to a front surface of the air-oxidizer manifold, wherein the front surface of the air-oxidizer manifold faces the first opening in the primary reactor chamber; at least one concentric channel, surrounding the dispersal port, recessed into the rear surface of the air-oxidizer manifold; at least one inlet port through a side surface of the air-oxidizer manifold and connected to the at least one concentric channel; and one or more jet holes extending through the air-oxidizer manifold from a recessed surface of the at least one concentric channel to the front surface of the air-oxidizer manifold. The one or more jet holes may be angled with respect to a longitudinal axis of the air-oxidizer manifold. The at least one concentric channel may comprise two or more concentric channels, wherein the at least one inlet port comprises two or more inlet ports that are each connected to one of the two or more concentric channels, and wherein the one or more jet holes comprise a plurality of jet holes. One of the two or more concentric channels may be recessed deeper into the rear surface of the air-oxidizer manifold than a second one of the two or more concentric channels.

The plastic-powered power generator may further comprise a pneumatic system that is configured to supply air through a first one of the two or more inlet ports, and supply an oxidizing agent through a second one of the two or more inlet ports. The pneumatic system may be further configured to supply the air through the second inlet port. The pneumatic system may be configured to: monitor a temperature in the primary reactor chamber; while the temperature remains below a predetermined threshold, supply the air through the first inlet port, and supply the oxidizing agent through the second inlet port; and, when the temperature exceeds the predetermined threshold, supply the air through both the first inlet port and the second inlet port, and reduce or stop the supply of the oxidizing agent through the second inlet port.

The air-fuel distribution assembly may further comprise an air-fuel mixer that is attached to the rear surface of the air-oxidizer manifold, wherein the air-fuel mixer comprises: an internal chamber; a fluidized polymer outlet port connecting the internal chamber to the dispersal port in the air-oxidizer manifold; an air inlet port configured to supply air flow through the internal chamber; and a fluidized polymer inlet port configured to supply fluidized polymer to the internal chamber.

The plastic-powered power generator may further comprise a fluidizer that comprises: a body comprising a first opening in a first end and a second opening in a second end, wherein the body is configured to house one or more layers of polymer; a base that covers the first opening in the body, wherein the base comprises an internal cavity, an air inlet port configured to receive air, and a porous membrane between the internal cavity and the first opening in the body; and a lid that covers the second opening in the body, wherein the lid comprises a fluidized polymer outlet port that is connected to the fluidized polymer inlet port of the air-fuel mixer, so as to provide fluidized polymer to the air-fuel mixer through the connected fluidized polymer outlet and inlet ports.

The ignition system may comprise one or more electrode pairs, wherein each of the one or more electrode pairs comprises a positive electrode aligned, through the primary reactor chamber, with a ground electrode. The one or more electrode pairs comprise a plurality of electrode pairs, wherein the plurality of electrode pairs alternate in orientation, such that no positive electrode is adjacent to another positive electrode and no ground electrode is adjacent to another ground electrode. The plurality of electrode pairs may comprise two or more electrode pairs that are oriented in a plane that is orthogonal to a plane in which two or more other electrode pairs are oriented.

The plastic-powered power generator may further comprise a distributor system that comprises: a high-spark energy generator and a ground distributor, wherein each of the high-spark energy generator and the ground distributor comprises a distributor cap comprising a plurality of towers arranged around a circumference of the distributor cap, wherein each of the plurality of towers on the distributor cap of the high-spark energy generator is electrically connected to a positive electrode in one of the plurality of electrode pairs, and wherein each of the plurality of towers on the distributor cap of the ground distributor is electrically connected to a ground electrode in one of the plurality of electrode pairs, and a pulley connected to a rotor by a shaft, such that, when the pulley rotates, the rotor passes underneath each of the plurality of towers in a sequence; and a motor that drives a timing belt to rotate the pulleys of the high-spark energy generator and the ground distributor, such that, as the rotor of the high-spark energy generator passes underneath a tower on the distributor cap of the high-spark energy generator, the rotor of the ground distributor simultaneously passes underneath a corresponding tower on the distributor cap of the ground distributor, so as to create a spark from the positive electrode that is electrically connected to the tower on the distributor cap of the high-spark energy generator to the ground electrode that is electrically connected to the corresponding tower on the distributor cap of the ground distributor.

The heat exchanger may be configured to receive an aqueous fluid into the coil and output steam, resulting from heating the coil, through a steam line connected to the coil, and wherein the plastic-powered power generator further comprises: an electrical generator; and a turbine configured to spin the electrical generator as the steam passes through the turbine, so as to produce electrical power from the electrical generator.

In an embodiment, a method is disclosed that comprises: pulverizing plastic waste to create sub-micron-scale polymer; fluidizing the polymer; and using the plastic-powered power generator by supplying the fluidized polymer, air, and an oxidizing agent to the primary reactor, supplying the aqueous fluid to the coil within the heat exchanger, igniting the mixture of the fluidized polymer, air, and oxidizing agent within the primary reactor chamber using the ignition system, and operating the blower to create air flow through the secondary reactor into the heat exchanger, to convert the aqueous fluid into steam that spins the turbine which spins the electrical generator to produce electrical power. Pulverizing the plastic waste may comprise: shredding the plastic waste into micron-scale plastic waste; and pelletizing the shredded micron-scale plastic waste into the sub-micron-scale polymer.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 1A-1C illustrate various views of a plastic-powered generator, according to an embodiment;

FIGS. 6A-6E illustrate various views of an air-fuel mixer, according to an embodiment;

FIGS. 7A-7G illustrate various views and components of an air-oxidizer manifold, according to an embodiment;

FIGS. 8A-8G illustrate various views and components of an air-fuel distribution assembly, according to an embodiment;

FIGS. 9A-9G illustrate various views of a primary reactor chamber, according to an embodiment;

FIGS. 10A-10G illustrate various views and components of a distributor system, according to an embodiment;

FIGS. 13A-13C illustrate various views of a catalytic converter, according to an embodiment;

DETAILED DESCRIPTION

Embodiments of a plastic-powered power generator are disclosed. The plastic-powered power generator uses plastic waste, which is a clean and energy-rich material derived from crude oils, as fuel. Advantageously, this conversion of plastic waste to fuel not only provides power, but also reduces plastic waste.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System
1.1. Overview

Figure 1A:
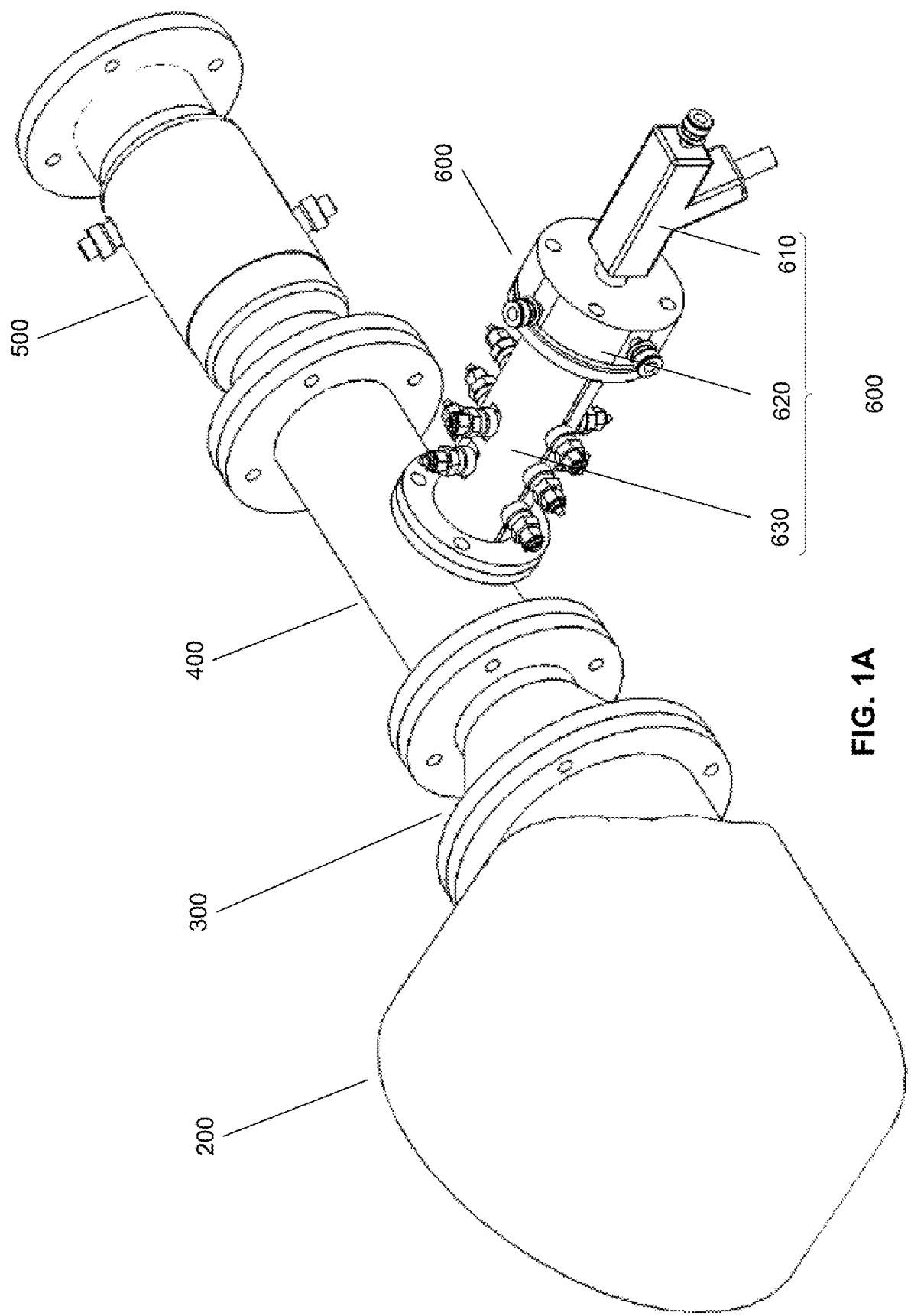
Figure 1B:
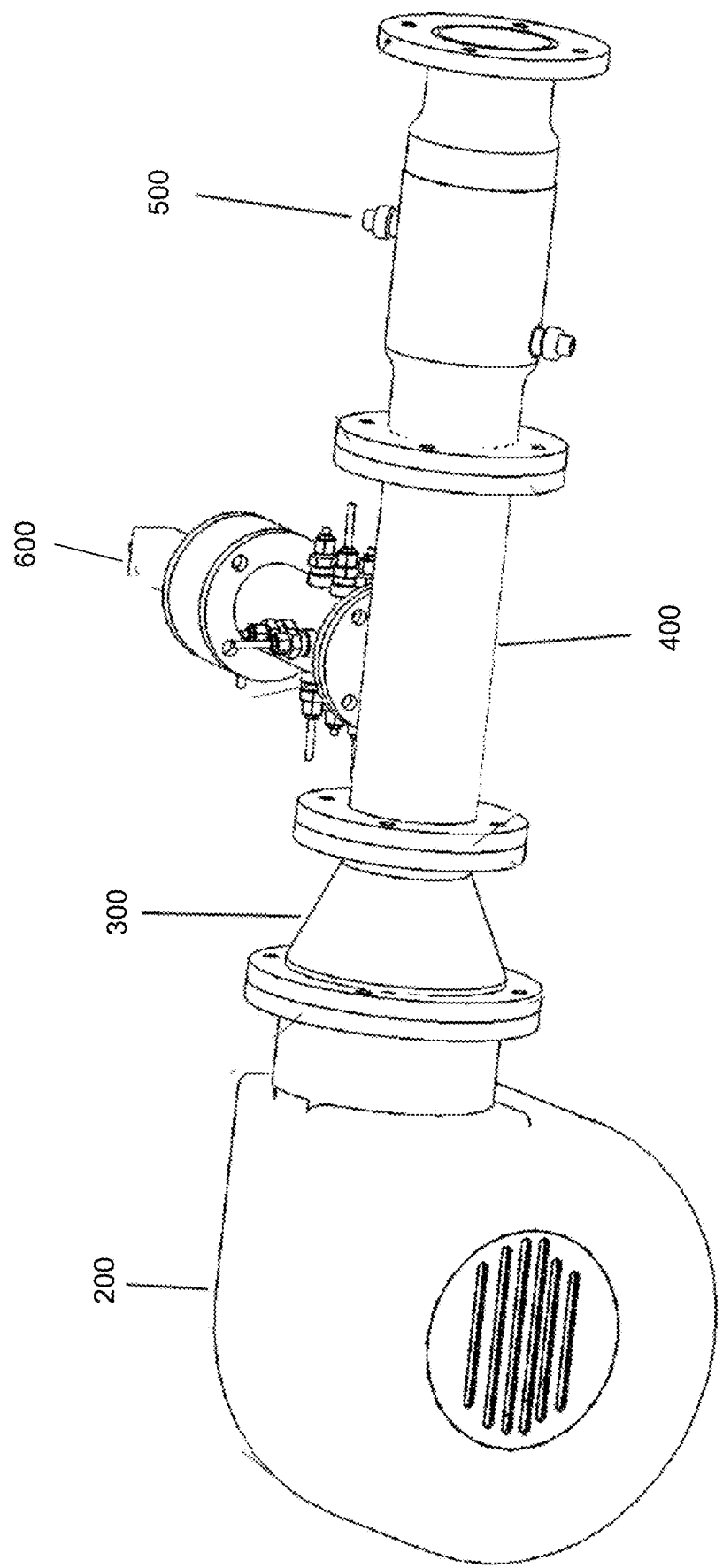

FIGS. 1A and 1B illustrate a plastic-powered power generator 100 in different perspective views, and FIG. 1C illustrates plastic-powered power generator 100 in an exploded perspective view, according to an embodiment. In the illustrated embodiment, plastic-powered power generator 100 comprises a blower 200, which may utilize a motor to blow air into an adaptor or reducer 300. Reducer 300 increases the velocity of the blown air as the air is fed into a secondary reactor 400. Secondary reactor 400 heats the air and outputs the heated air into heat exchanger 500, which may heat water to produce steam. In addition, a primary reactor 600 is connected to secondary reactor 400 at a perpendicular angle with respect to a longitudinal axis through secondary reactor 400.

Plastic-powered power generator 100 may be manufactured from one or more materials, including pure ceramic, ferrous, or non-ferrous metal that is ceramic-coated or anodized. Anodization is an electrolytic passivation process, used to increase the thickness of the natural oxide layer on the surface of non-ferrous metal parts. Advantageously, ceramic-coated or anodized ferrous metal creates a dielectric state to protect against the dangers of static electricity, including grounding.

Plastic-powered power generator 100 may be manufactured to any scale. For example, plastic-powered power generator 100 may be manufactured as a small-scale, portable generator. Alternatively, plastic-powered power generator 100 may be manufactured as a large-scale regional power plant. As another alternative, a system, comprising any quantity of plastic-powered power generators 100, may be constructed to provide any desired amount of electrical power.

1.2. Blower

Figure 2A:
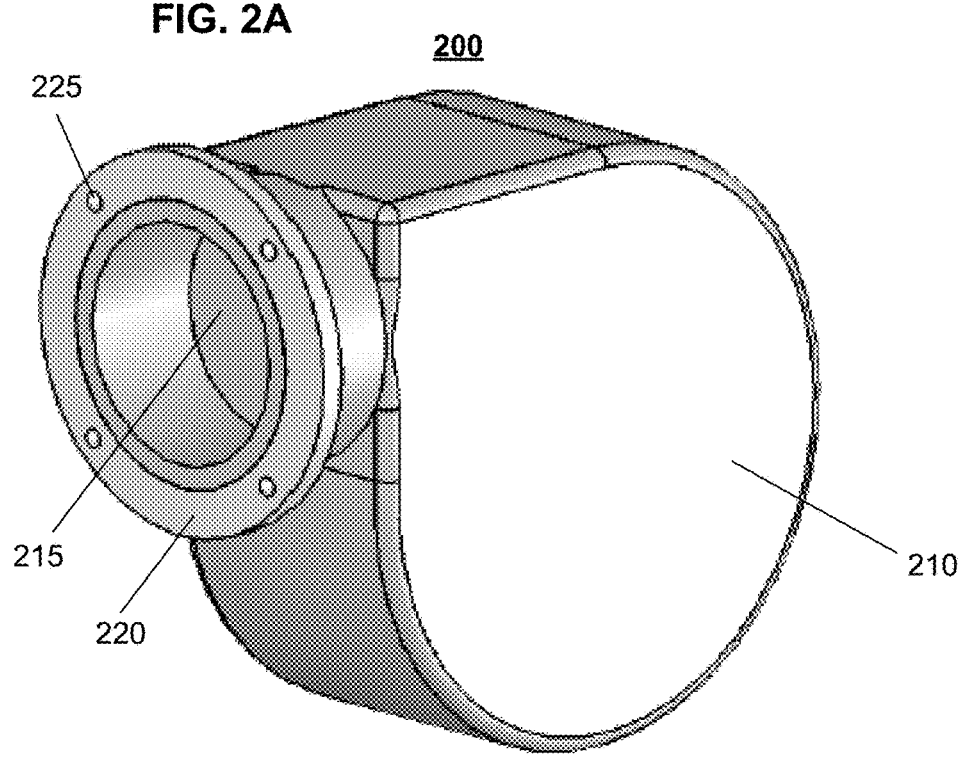
FIGS. 2A and 2B illustrate various views of a blower, according to an embodiment.
Figure 2B:
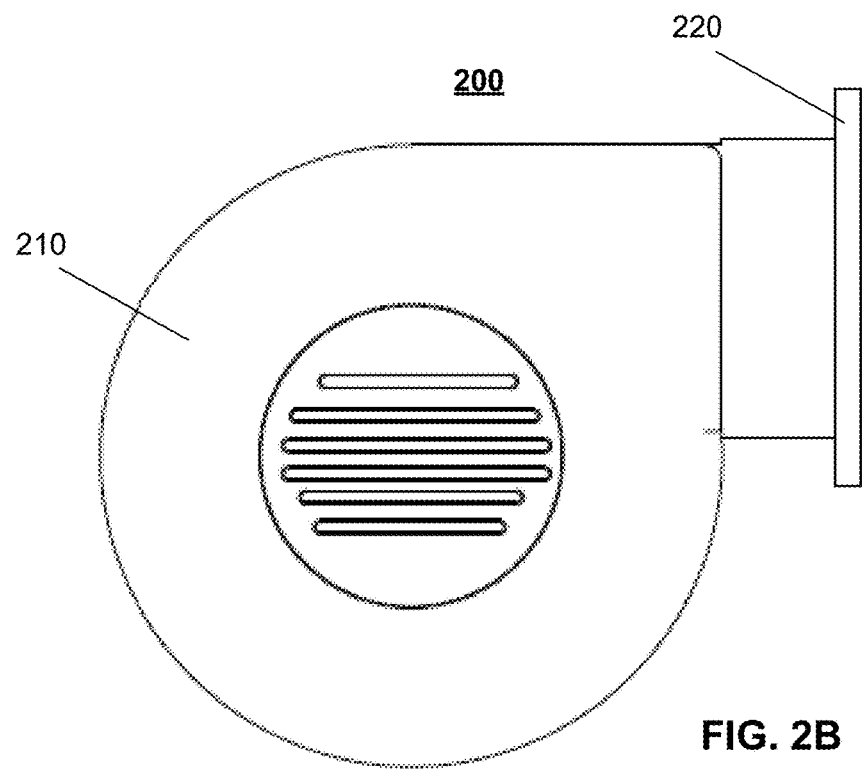

FIGS. 2A and 2B illustrate blower 200 in perspective and side views, respectively, according to an embodiment. In the illustrated embodiment, blower 200 comprises a main body 210 and a flange 220.

Main body 210 may house a blower motor that spins to generate air flow out of opening 215 in main body 210. Alternatively, another motor or mechanism may be used to generate the air flow out of opening 215.

Flange 220 may comprise one or more, and preferably multiple (e.g., four or more), holes 225. Each hole 225 may be configured to receive a bolt therethrough.

1.3. Reducer

Figure 3A:
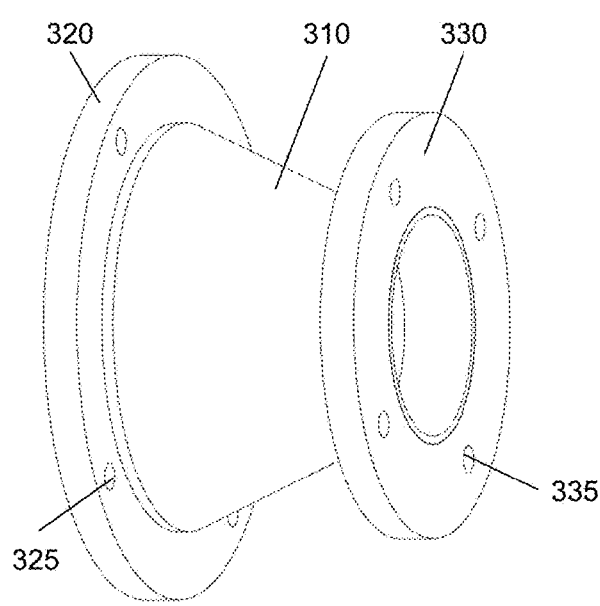
FIGS. 3A-3D illustrate various views and components of a reducer, according to an embodiment.
Figure 3B:
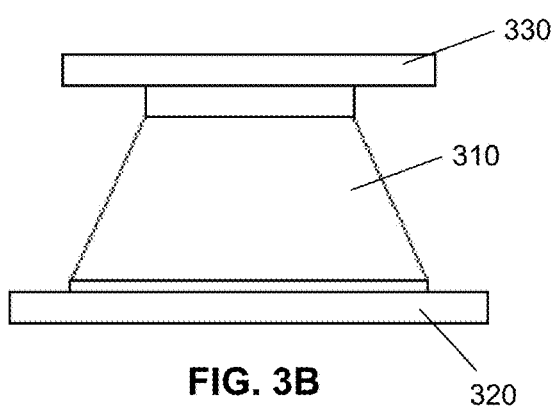
Figure 3C:
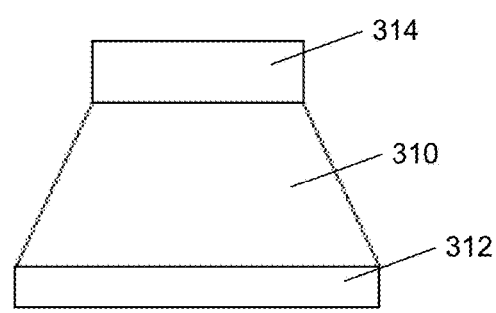
Figure 3D:
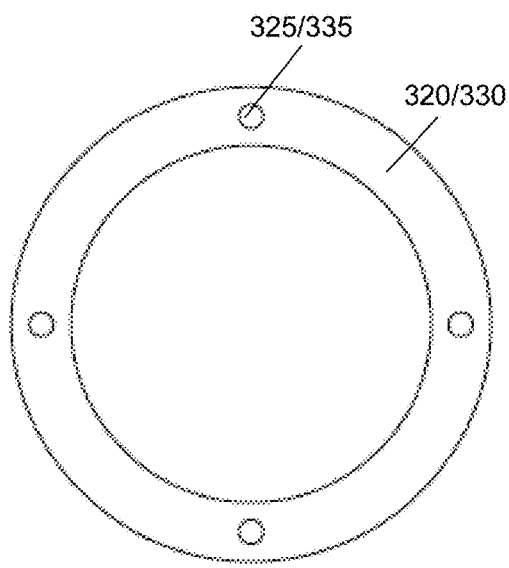

FIGS. 3A and 3B illustrate reducer 300 in perspective and side views, and FIGS. 3C and 3D illustrate individual components of reducer 300, according to an embodiment. In the illustrated embodiment, reducer 300 comprises an adapter cone 310 that is open on both ends, with a flange 320 on the larger end (i.e., the end with the larger diameter) and a flange 330 on the smaller end (i.e., the end with the smaller diameter).

Adapter cone 310 has a substantially conical shape, with openings on both ends. However, adapter cone 310 may have substantially cylindrical portions 312 and 314 on both ends. Flanges 320 and 330 may be seated on or integrated with these substantially cylindrical portions 312 and 314, respectively.

Flange 320 may comprise one or more, and preferably multiple (e.g., four or more), holes 325. Each hole 325 may be configured to receive a bolt therethrough. Specifically, flange 320 may be adjoined to flange 220 of blower 200, with each hole 325 aligned to a corresponding hole 225. Flange 320 may then be fixed to flange 220 by inserting bolts through the aligned holes 225/325, and threading and tightening the bolts through corresponding nuts, to thereby fix reducer 300 to blower 200. Alternatively or additionally, other mechanisms may be used to fix flanges 320 and 220 to each other and/or to fix reducer 300 and blower 200 to each other.

Flange 330 may be substantially similar to flange 320, but with a smaller inner diameter than flange 320, and optionally a smaller outer diameter as well. Similarly to flange 320, flange 330 may comprise one or more, and preferably multiple (e.g., four or more), holes 335 configured to receive a bolt therethrough.

As air flows through the conical reducer, from the larger diameter end, defined by end portion 312 and flange 320, to the smaller diameter end, defined by end portion 314 and flange 330, the speed of the air will increase. Thus, reducer 300 increases the speed of the air flowing out of opening 215 of blower 200 and into the proximal end of secondary reactor 400.

1.4. Secondary Reactor

Figure 4A:
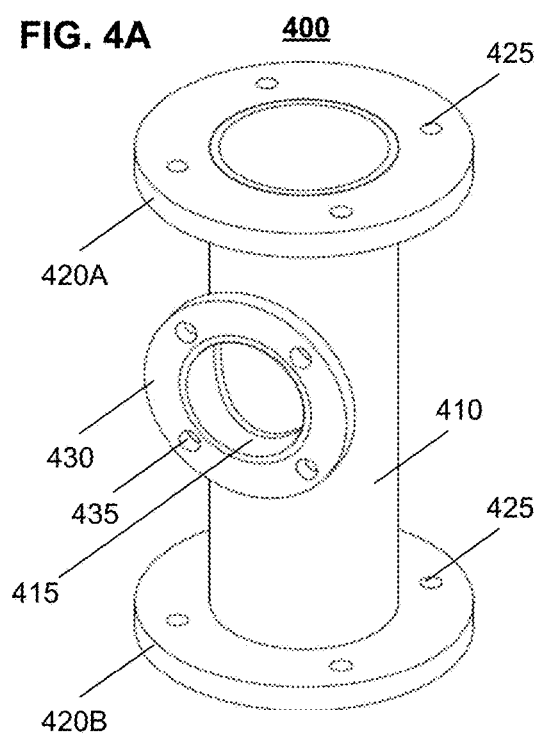
FIGS. 4A-4E illustrate various views and components of a secondary reactor, according to an embodiment.
Figure 4B:
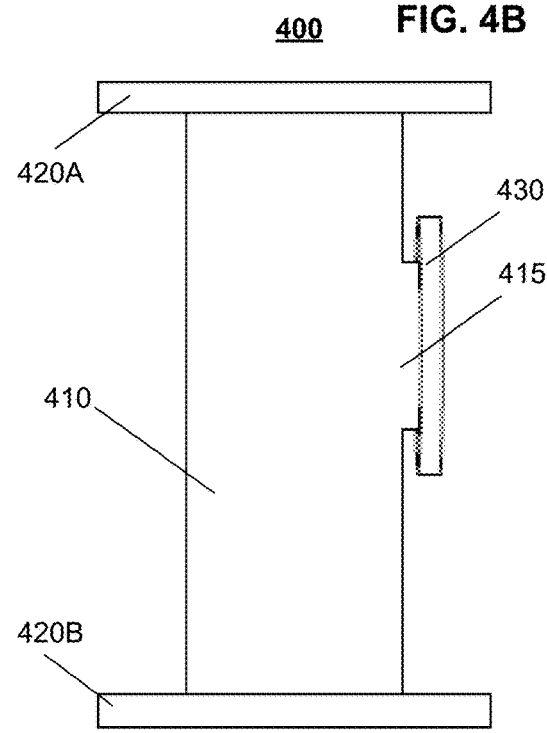
Figure 4C:
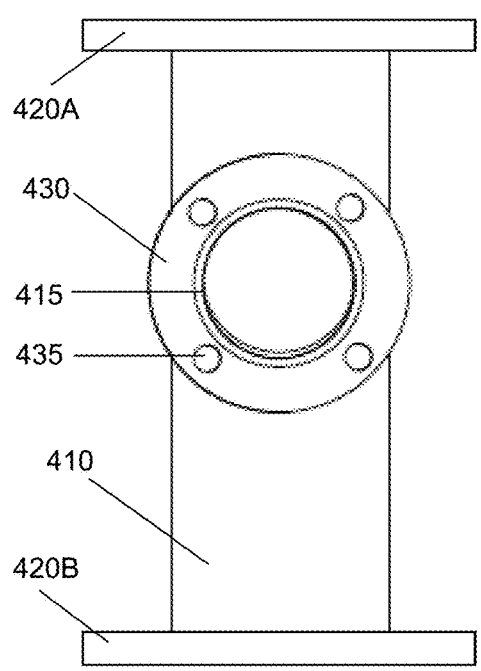
Figure 4D:
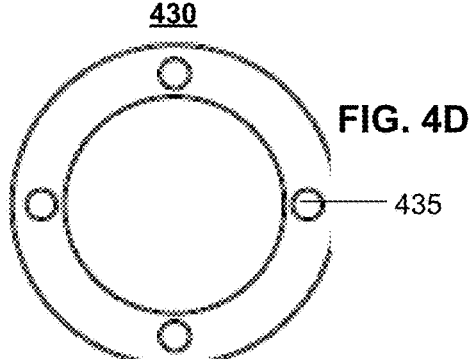
Figure 4E:
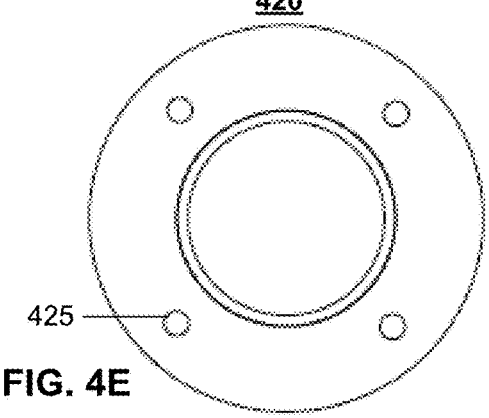

FIG. 4A illustrates secondary reactor 400 in a perspective view, and FIGS. 4B and 4C illustrate secondary reactor 400 in different side views, according to an embodiment. FIGS. 4D and 4E illustrate individual components of secondary reactor 400, according to an embodiment. In the illustrated embodiment, secondary reactor 400 comprises a substantially cylindrical body 410 that is open on both ends, with a flange 420A on one end, a flange 420B on the other end, and a flange 430 around a substantially cylindrical lip 415 that intersects cylindrical body 410 at an orthogonal angle to thereby provide an open pathway into the interior of cylindrical body 410 through the side of cylindrical body 410.

Cylindrical body 410 is substantially cylindrical, with openings on both ends and a circular hole defined by a cylindrical lip 415 extending out from cylindrical body 410, to provide a pathway through the side of cylindrical body 410 into the interior of cylindrical body 410. Cylindrical body 410 is configured to allow air from blower 200 to flow from one end (e.g., the opening surrounded by flange 420A) to the opposite end (e.g., the opening surrounded by flange 420B).

Flanges 420A and 420B may be, but are not necessarily, identical. Each flange 420 may comprise one or more, and preferably multiple (e.g., four or more), holes 425. Each hole 425 may be configured to receive a bolt therethrough. Specifically, flange 420A may be adjoined to flange 330 of reducer 300, with each hole 425 aligned to a corresponding hole 335 in flange 330. Flange 420A may then be fixed to flange 330 by inserting bolts through all of the aligned holes 335/435, and threading and tightening the bolts through corresponding nuts, to thereby fix secondary reactor 400 to reducer 300. Alternatively or additionally, other mechanisms may be used to fix flanges 420A and 330 to each other and/or to fix secondary reactor 400 and reducer 300 to each other.

Flange 430 may be substantially similar to flanges 420, but may have a different inner and/or outer diameter than flanges 420. In the illustrated embodiment, flange 430 has a smaller inner and outer diameter than flanges 420. However, in a different embodiment, flange 430 may have the same or different inner and/or outer diameters than flanges 420. Similarly to flanges 420, flange 430 may comprise one or more, and preferably multiple (e.g., four or more), holes 435. Each hole 435 may be configured to receive a bolt therethrough.

As air flows through secondary reactor 400, the air is heated by primary reactor 600 via a flame, produced by primary reactor 600, through the hole defined by lip 415. The heated air from secondary reactor 400 flows into heat exchanger 500.

1.5. Heat Exchanger

Figure 5A:
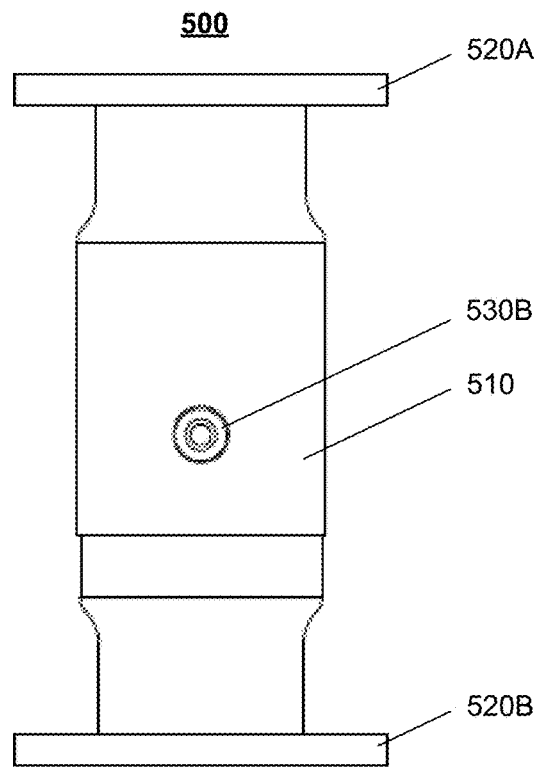
FIGS. 5A-5F illustrate various views and components of a heat exchanger, according to an embodiment.
Figure 5B:
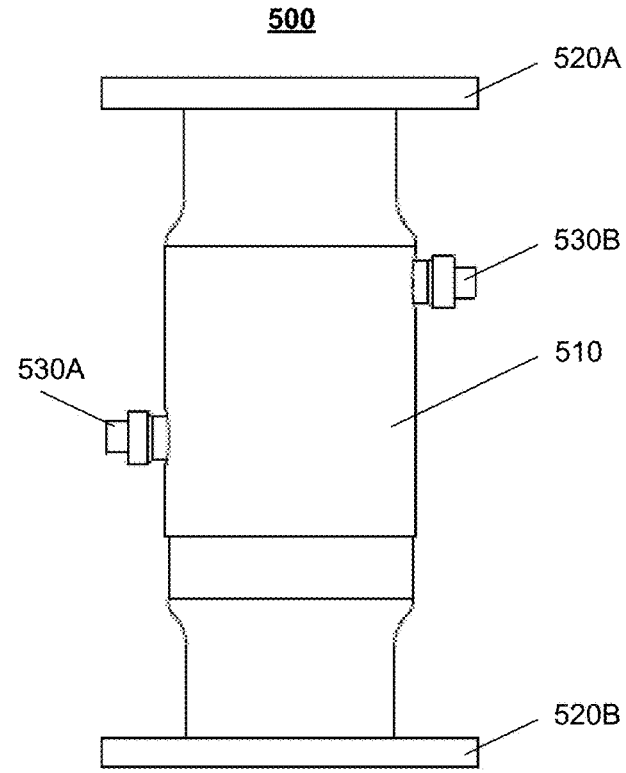
Figure 5C:
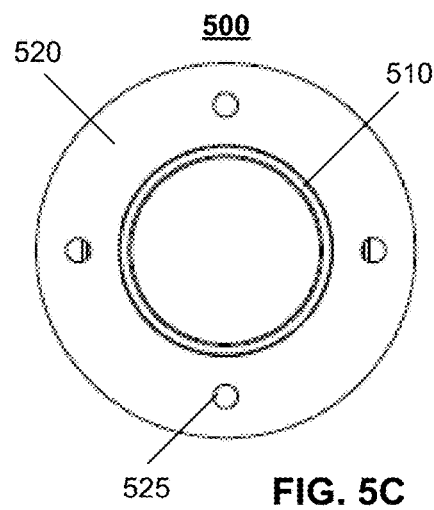
Figure 5D:
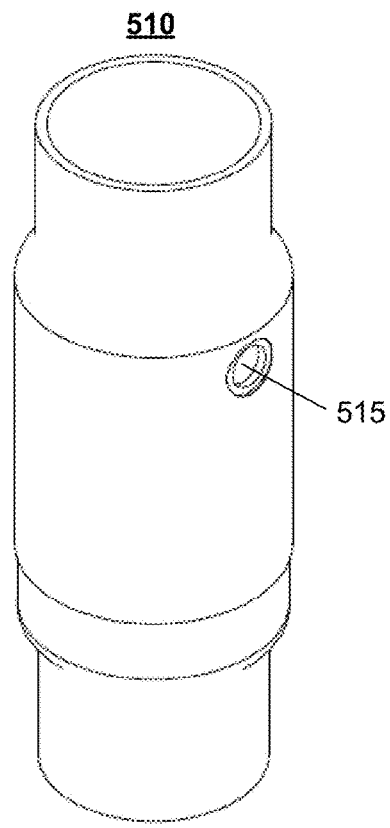
Figure 5E:
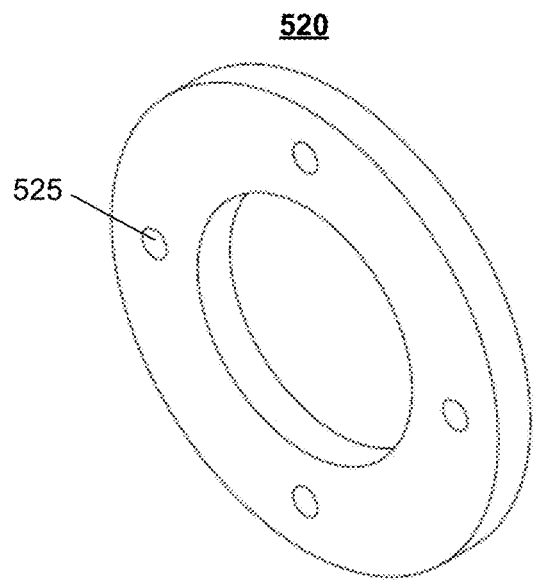
Figure 5F:
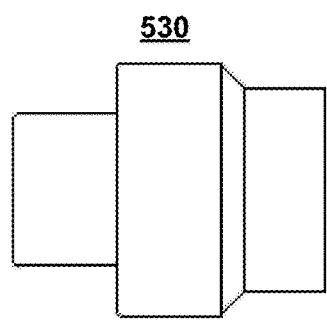

FIGS. 5A and 5B illustrate heat exchanger 500 in orthogonal side views, according to an embodiment. FIG. 5C illustrates heat exchanger 500 down its longitudinal axis, according to an embodiment. FIGS. 5D-5F illustrate individual components of heat exchanger 500, according to an embodiment. In the illustrated embodiment, heat exchanger 500 comprises a substantially cylindrical body 510 that is open on both ends, with a flange 520A on one end, a flange 520B on the other end, and at least two connector fittings 530 on substantially opposite sides of cylindrical body 510.

Cylindrical body 510 is substantially cylindrical, with openings on both ends and fitting holes 515 (e.g., circular holes in the illustrated embodiment) cut into substantially opposite sides to receive connector fittings 530. Cylindrical body 510 may house a coil through which fluid flows. For example, the coil may be wound around an inner circumference of cylindrical body 510, with an open pathway through the center of the coil (i.e., down the longitudinal axis of cylindrical body 510), such that exhaust from secondary reactor 400 can pass through cylindrical body 510 via the open pathway, while heating the coils. The fluid, flowing through the coil, may comprise water. In an embodiment, the fluid may be an aqueous solution containing ethylene glycol, which helps reduce corrosion and freezing within the coil.

Flanges 520A and 520B may be, but are not necessarily, identical. Each flange 520 may comprise one or more, and preferably multiple (e.g., four or more), holes 525. Each hole 525 may be configured to receive a bolt therethrough. Specifically, flange 520A may be adjoined to flange 420B of secondary reactor 400, with each hole 525 aligned to a corresponding hole 425 in flange 420B. Flange 520A may then be fixed to flange 420B by inserting bolts through all of the aligned holes 425/525, and threading and tightening the bolts through corresponding nuts, to thereby fix heat exchanger 500 to secondary reactor 400. Alternatively or additionally, other mechanisms may be used to fix flanges 520A and 420B to each other and/or to fix heat exchanger 500 and secondary reactor 400 to each other.

Connector fittings 530A and 530B may be, but are not necessarily, identical. Each connector fitting 530 is configured to be seated within fitting holes 515 in opposing sides of cylindrical body 510, and be releasably connected to an external line. Within cylindrical body 510, connector fittings 520A and 530B are attached to opposite ends of the coil, such that fluid may flow, through connector fitting 530A, from one end of the coil to the other end of the coil, and out connector fitting 530B. Thus, one connection fitting 520A may be used to input fluid into the coil within cylindrical body 510, whereas the other connection fitting 520B may be used to output steam from cylindrical body 510. An input fluid line may feed the fluid into connection fitting 520A and into the internal coil of cylindrical body 510, where it is converted to steam, while an output line may allow the steam from the internal coil of cylindrical body 510 to flow out into an output steam line or other device or system.

1.6. Primary Reactor

FIGS. 6A-9F illustrate various isolated components of primary reactor 600, according to an embodiment. Specifically, FIGS. 6A-6E illustrate various views of an air-fuel mixer 610 of primary reactor 600, FIGS. 7A-7G illustrate various views and components of an air-oxidizer manifold 620, FIGS. 8A-8G illustrate various views and components of an air-fuel distribution assembly comprising air-fuel mixer 610 and air-oxidizer manifold 620, and FIGS. 9A-9G illustrate various views and components of primary reaction chamber 630, according to embodiments. In addition, FIGS. 10A-10G illustrate various views and components of an ignition system that may be utilized to ignite primary reactor 600, according to an embodiment, FIGS. 11A-11D illustrate a fluidizer 1100 that may be used feed plastic waste as fuel to air-fuel mixer 610, according to an embodiment, and FIGS. 12A and 12B illustrate pneumatic systems 1200 that may be used with primary reactor 600, according to embodiments. While primary reactor 600 may comprise or utilize all of the illustrated components, it is not necessary for all embodiments of primary reactor 600 to comprise all of the illustrated components in the illustrated configuration. Rather, embodiments of primary reactor 600 may comprise a combination of some of the illustrated embodiments of components with non-illustrated embodiments of the other components, and/or may omit some of the illustrated components.

1.6.1. Air-Fuel Mixer

FIG. 6A illustrates air-fuel mixer 610 in a perspective view, and FIGS. 6B-6D illustrate air-fuel mixer 610 in a front view, rear view, and bottom view, respectively, according to an embodiment. FIG. 6E illustrates air-fuel mixer 610 in a cross-sectional side view, according to an embodiment. In the illustrated embodiments, air-fuel mixer 610 comprises an air inlet port 612, a fluidized polymer inlet port 614, an internal chamber 616, and a fluidized polymer outlet port 618.

Air inlet port 612 may comprise an opening in the rear of air-fuel mixer 610 that provides a first pathway (e.g., a straight and/or cylindrical flow path) into internal chamber 616 within the body of air-fuel mixer 610. A regulated air source (e.g., tank of compressed air) may be connected to air inlet port 612 to provide regulated air through air inlet port 612 into internal chamber 616. Air inlet port 612 may be formed in any suitable manner, so that it may be connected to a regulated air source.

Similarly, fluidized polymer inlet port 614 may comprise an opening in the bottom-rear of air-fuel mixer 610 that provides a second pathway (e.g., a straight and/or cylindrical flow path) into internal chamber 616 within the body of air-fuel mixer 610. A fluidizer (e.g., fluidizer 1100) may be connected to fluidized polymer inlet port 614 to provide fluidized polymer through fluidized polymer inlet port 614 into internal chamber 616. Fluidized polymer inlet port 614 may be formed in any suitable manner, so that it may be connected to a fluidizer.

Fluidized polymer outlet port 618 may comprise an opening in the front of air-fuel mixer 610 that provides a third pathway (e.g., a straight and/or cylindrical flow path) out of internal chamber 616. Thus, regulated air, provided through air inlet port 612, and fluidized polymer, provided through fluidized polymer inlet port 614, mix within internal chamber 616. This air-fuel mixture within internal chamber 616 flows out of fluidized polymer output port 618. Fluidized polymer output port 618 may be formed in any suitable manner, so that it may be connected to air-oxidizer manifold 620. As illustrated in particular in FIGS. 6B and 6E, the diameter of fluidized polymer output port 618 and/or internal chamber 616 may be larger than the diameter of air inlet port 612 and/or fluidized polymer inlet port 614.

In the illustrated embodiment, air-fuel mixer 610 comprises a straight pathway through air inlet port 612, internal chamber 616, and fluidized polymer output port 618 (e.g., comprising the first and third pathways), and an angled pathway through fluidized polymer inlet port 614 into internal chamber 616 (e.g., comprising the second pathway). The angled pathway may be at any suitable angle with respect to the straight pathway (e.g., 30°-45°). However, it should be understood that the first, second, and third pathways may be arranged in any suitable configuration with respect to each other, as long as the pathways result in the air, from air inlet port 612, converging with the fluidized polymer, from fluidized polymer inlet port 614, to create an air-fuel mixture that exits fluidized polymer outlet port 618.

1.6.2. Air-Oxidizer Manifold

Figure 7D:
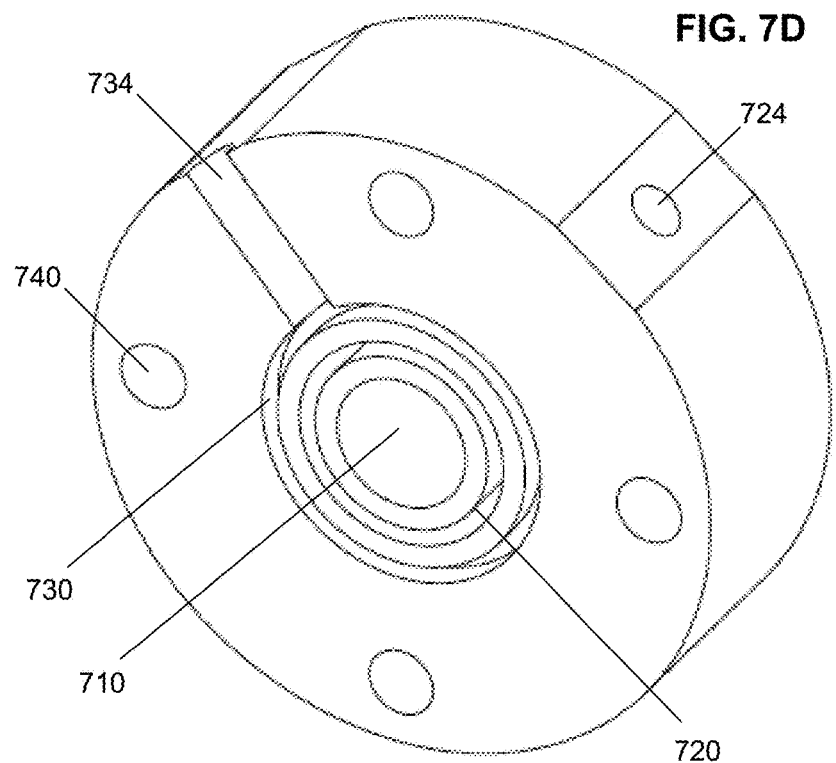
Figure 7E:
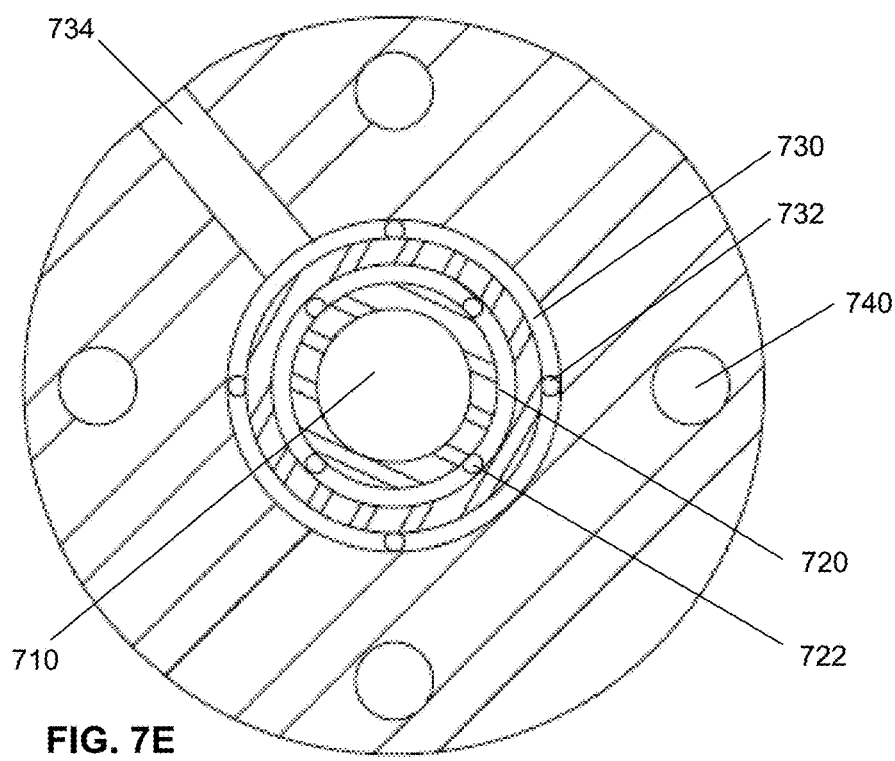
Figure 7F:
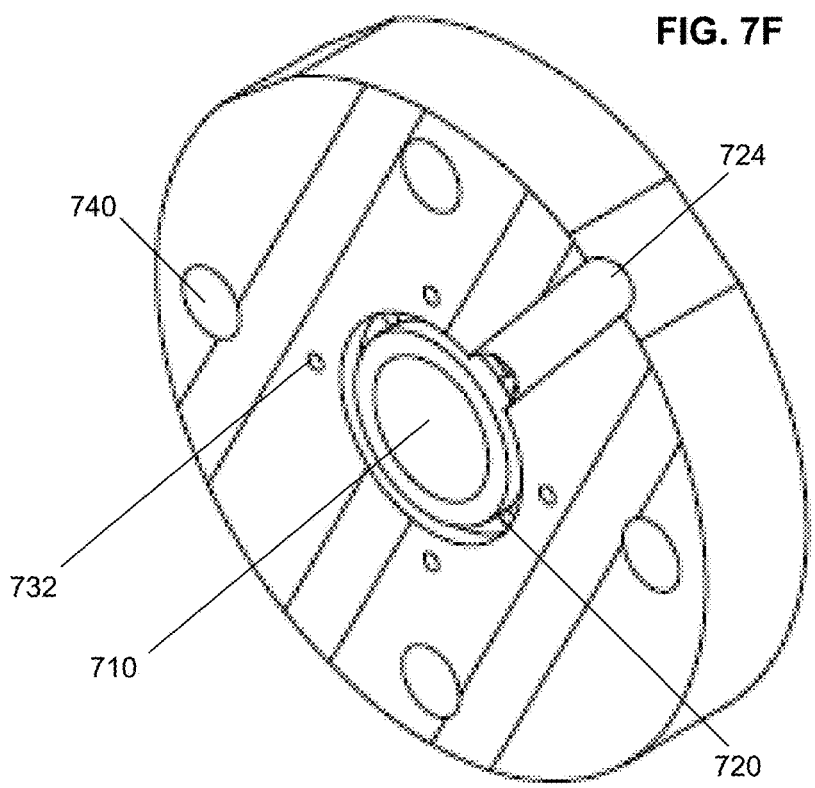
Figure 7G:
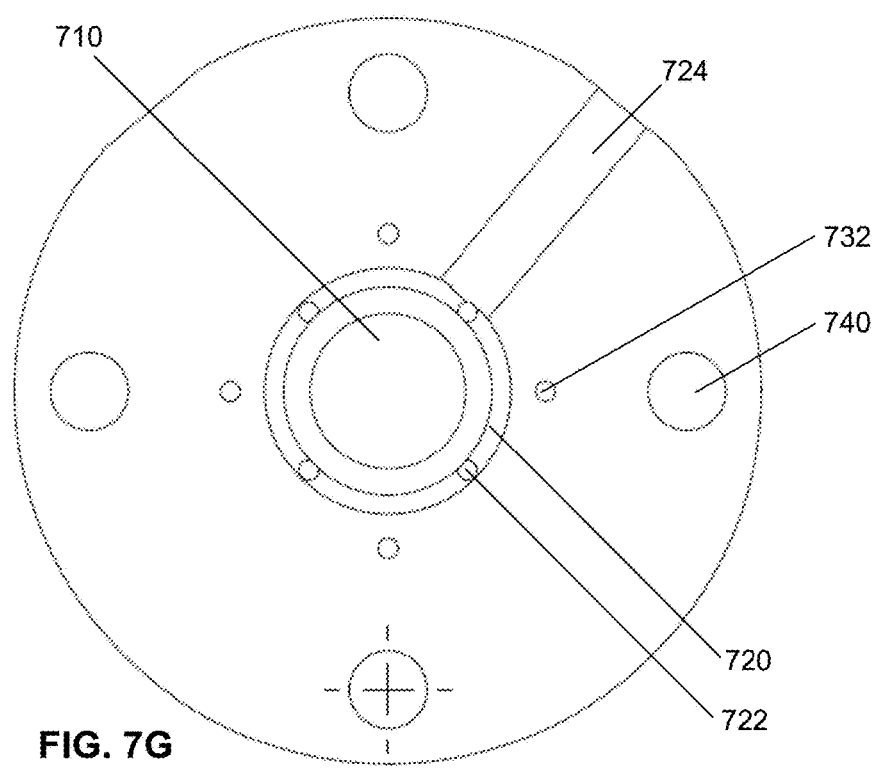

FIG. 7A illustrates air-oxidizer manifold 620 in perspective view, and FIG. 7B illustrates air-oxidizer manifold 620 in a rear view, according to an embodiment. FIG. 7C illustrates a close-up of a region, on the rear of air-oxidizer manifold 620, defined by circle A in FIG. 7B, according to an embodiment. FIGS. 7D and 7E illustrate a cut-away of a rear portion of air-oxidizer manifold 620 in perspective and rear views, respectively, according to an embodiment. FIGS. 7F and 7G illustrate a deeper cut-away of the rear portion of air-oxidizer manifold 620, than in FIGS. 7D and 7E, in perspective and rear views, respectively, according to an embodiment. In the illustrated embodiments, the rear surface of air-oxidizer manifold 620 comprises a fluidized polymer dispersal port 710, with concentric channels 720 and 730 around fluidized polymer dispersal port 710. While dispersal port 710 and concentric channels 720 and 730 are illustrated as circular, it should be understood that other shapes could be used instead (e.g., square, triangular, etc.).

Concentric channel 720 may be an oxidizer distribution channel formed as a circular recess in the rear surface of air-oxidizer manifold 620. Concentric channel 720 comprises one or more, and preferably multiple (e.g., four or more), jet holes 722. Jet holes 722 may be arranged equidistantly apart from each other within the recessed surface of concentric channel 720. Each jet hole 722 provides a pathway for an oxidizing agent from concentric channel 720 in the rear surface of air-oxidizer manifold 620, through the interior of air-oxidizer manifold 620, out the front surface of air-oxidizer manifold 620. Each jet hole 722 may be angled (e.g., 4°) with respect to a longitudinal axis X passing through the center of fluidized dispersal port 710. This angling of jet hole(s) 722 facilitates the creation of a vortex as the oxidizing agent exits the front surface of air-oxidizer manifold 620. The diameter of each jet hole 722 may be approximately 0.01 to 0.1 inches, with all jet holes 722 having the same diameter as each other, or alternatively, two or more jet holes 722 having different diameters than each other.

In addition, concentric channel 720 is connected to an oxidizer inlet port 724. As illustrated, oxidizer inlet port 724 provides a pathway, along a lateral axis that is perpendicular to the longitudinal axis X, from a side surface of air-oxidizer manifold 620, into concentric channel 720. Thus, the oxidizing agent may flow through oxidizer inlet port 724, into concentric channel 720, where it is distributed through jet hole(s) 722, and out of the front of air-oxidizer manifold 620.

Concentric channel 730 may be an air distribution channel formed as a circular recess in the rear surface of air-oxidizer manifold 620. Concentric channel 730 comprises one or more, and preferably multiple (e.g., four or more), jet holes 732. Jet holes 732 may be arranged equidistantly apart from each other within the recessed surface of concentric channel 730. Each jet hole 732 provides a pathway for air from concentric channel 730 in the rear surface of air-oxidizer manifold 620, through the interior of air-oxidizer manifold 620, out the front surface of air-oxidizer manifold 620. Each jet hole 732 may be angled (e.g., 4°) with respect to the longitudinal axis X passing through the center of fluidized dispersal port 710. The angle may be the same or different than the angle of jet hole(s) 722. This angling of jet hole(s) 732 facilitates the creation of a vortex as the air exits air-oxidizer manifold 620. The diameter of each jet hole 732 may be approximately 0.01 to 0.1 inches, with all jet holes 732 having the same diameter as each other, or alternatively, two or more jet holes 732 having different diameters than each other.

In addition, concentric channel 730 is connected to an air inlet port 734. As illustrated, air inlet port 734 provides a pathway, along a lateral axis that is perpendicular to the longitudinal axis X, from a side surface of air-oxidizer manifold 620, into concentric channel 730. Thus, the air may flow through air inlet port 734, into concentric channel 730, where it is distributed through jet hole(s) 732, and out of the front of air-oxidizer manifold 620. As illustrated in FIG. 7C, jet hole(s) 722 and 732 may be offset from each other, such that no jet hole 722 is aligned with any jet hole 732 along a lateral axis passing through the center of fluidized dispersal port 710. For example, the pattern of jet holes 722 and the pattern of jet holes 732 may be such that the distances of jet holes 722 from jet holes 732 is maximized. In the illustrated embodiment, the pattern of jet holes 722 is a square (e.g., a jet hole 722 positioned at each corner of a square), and the pattern of jet holes 732 is a square that is rotated 45° with respect to the square pattern of jet holes 722.

As illustrated by the cut-away views in FIGS. 7D-7G, concentric channel 720 is deeper (i.e., recessed farther from the rear surface of air-oxidizer manifold 620) than concentric channel 730. Consequently, as shown by FIGS. 7D and 7F, oxidizer inlet port 724 is also deeper (i.e., farther from the rear surface of air-oxidizer manifold 620) than air inlet port 734. Notably, a first pathway is provided through air-oxidizer manifold 620 by the combination of oxidizer inlet port 724, concentric channel 720, and jet(s) 722, and a second pathway is provided through air-oxidizer manifold 620 by the combination of air inlet port 734, concentric channel 730, and jet(s) 732. While the first pathway will be described as providing a flow of oxidizing agent and the second pathway will be described as providing a flow of air, this configuration could be reversed, such that the first pathway provides the flow of air and the second pathway provides the flow of oxidizing agent. Also, it should be understood that the different pathways may provide different fluids at different times. For example, the first pathway may provide a flow of oxidizing agent during ignition, but be switched to provide a flow of air once a temperature in the primary reactor 600 exceeds a certain threshold temperature value (e.g., 600° C.). In addition, air-oxidizer manifold 620 could comprise additional pathways than those illustrated, including, for example, additional inlet ports, concentric channels, and/or jet holes.

Air-oxidizer manifold 620 may also comprise one or more, and preferably multiple (e.g., four or more), holes 740. Each hole 740 may pass through both the front and rear surfaces of air-oxidizer manifold, parallel to longitudinal axis X, and be configured to receive a bolt therethrough.

1.6.3. Air-Fuel Distribution Assembly

Figure 8C:
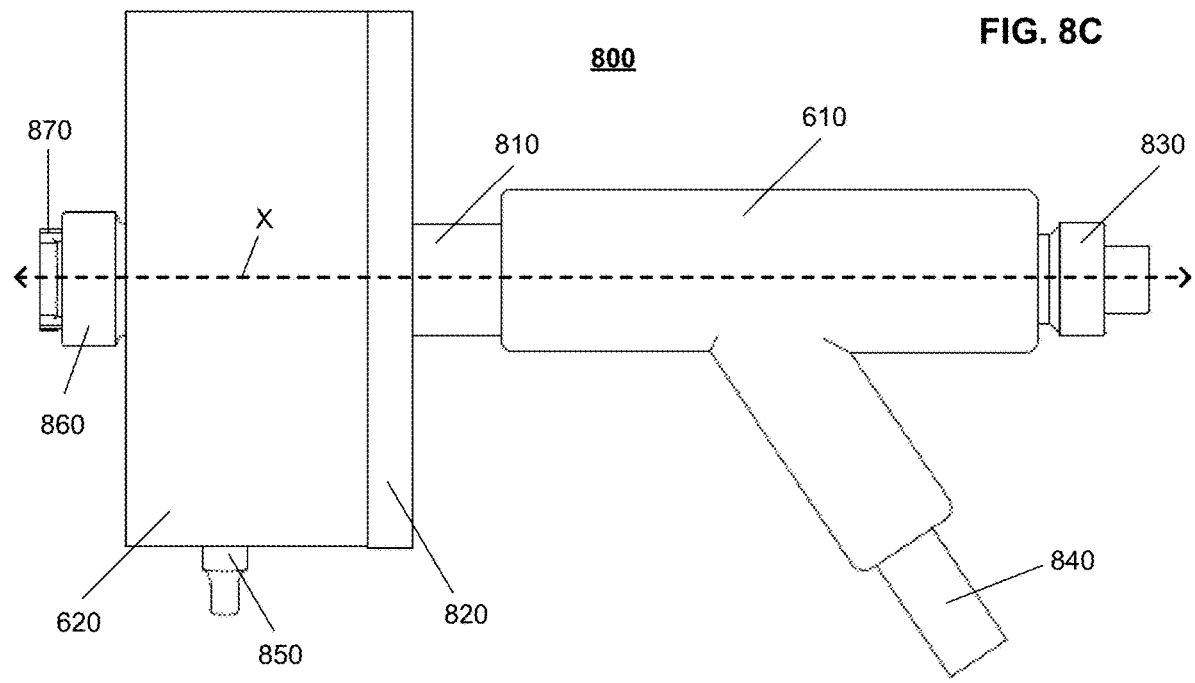
Figure 8D:
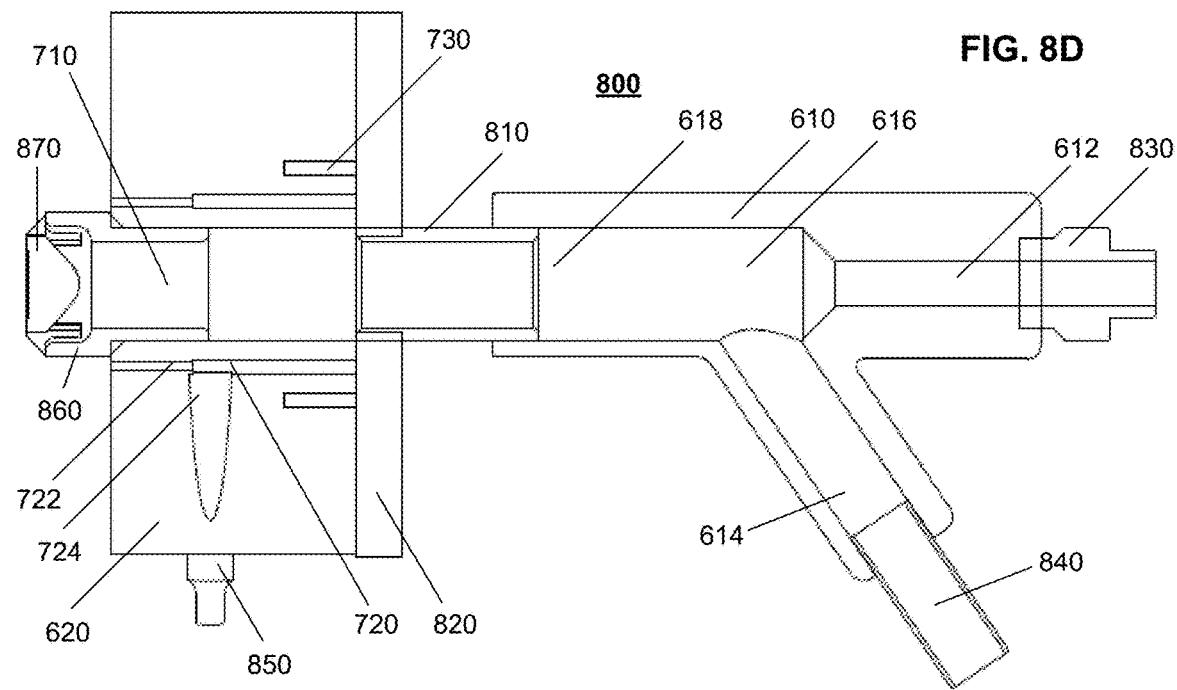
Figure 8E:
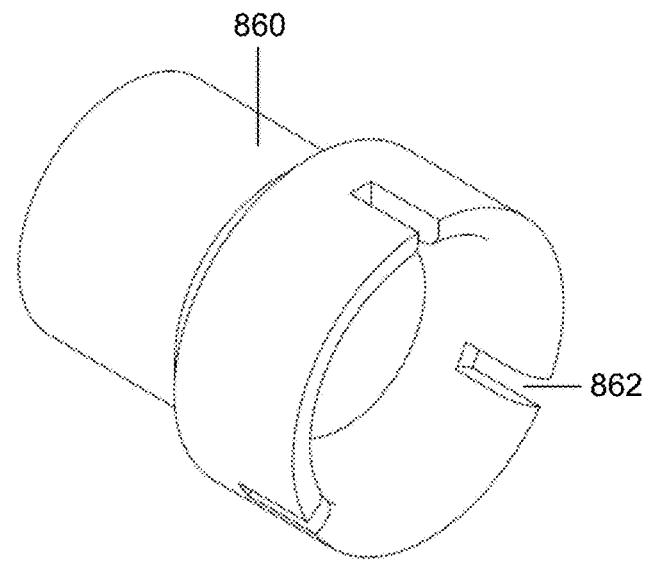
Figure 8F:
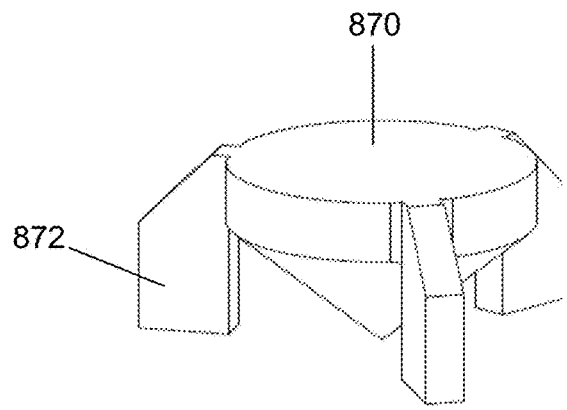
Figure 8G:
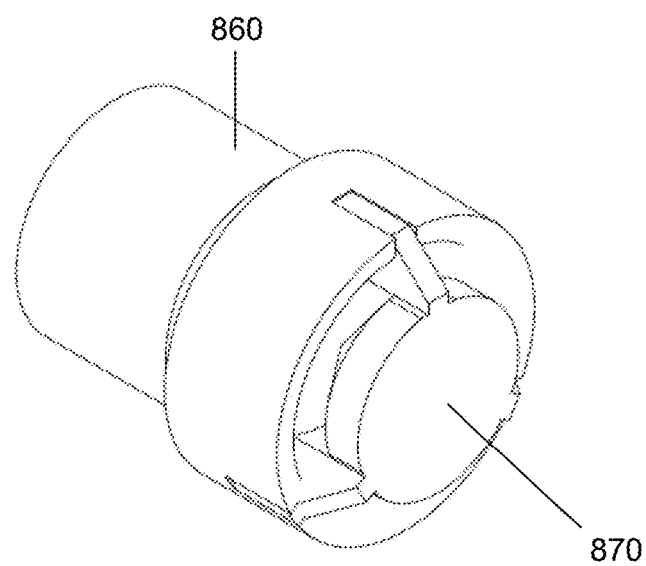

FIGS. 8A and 8B illustrate an air-fuel distribution assembly 800 in front and rear perspective views, respectively, and FIG. 8C illustrates air-fuel distribution assembly 800 in a side view, according to an embodiment. FIG. 8D illustrates air-fuel distribution assembly 800 in a cross-sectional side view, according to an embodiment, and FIGS. 8E-8G illustrate various components of air-fuel distribution assembly 800, according to an embodiment. In the illustrated embodiments, air-fuel distribution assembly 800 comprises a combination of air-fuel mixer 610 and air-oxidizer manifold 620.

A transfer tube 810 with a flange 820 may be used to join air-fuel mixer 610 with air-oxidizer manifold 620. For example, a hollow transfer tube 810 may be inserted into fluidized polymer outlet port 618 and/or otherwise attached and/or fixed to air-fuel mixer 610, so as to maintain an open pathway out of fluidized polymer outlet port 618. Alternatively, transfer tube 810 may be integral with air-fuel mixer 610.

A flange 820 may be mounted on or integral with transfer tube 810. Flange 820 may comprise one or more, and preferably multiple (e.g., four or more), holes 825. Each hole 825 may be configured to receive a bolt therethrough. Hole(s) 825 may correspond to and align with hole(s) 740 in air-oxidizer manifold 620, such that a bolt can be inserted through each hole 825 into a corresponding hole 740 to adjoin flange 820 with the rear surface of air-oxidizer manifold 620.

Air-fuel distribution assembly 800 may also comprise an air inlet fitting 830, fluidized polymer inlet fitting 840, an oxidizer fitting 850, and/or an air fitting (not shown). Air inlet fitting 830 is installed in air inlet port 612 of air-fuel mixer 610, and fluidized polymer inlet fitting 840 is installed in fluidized polymer inlet port 614 of air-fuel mixer 610. Similarly, oxidizer fitting 850 is installed in oxidizer inlet port 724 in air-oxidizer manifold 620, and an air fitting may be installed in air inlet port 734 of air-oxidizer manifold 620. Each fitting may be configured to be seated within its respective port and be releasably connected to an input line or other device. Each port permits its respective fluid (e.g., air, oxidizing agent, or fluidized polymer) to flow into air-fuel distribution assembly 800.

As regulated air flows through air inlet fitting 830 into air inlet port 612 and fluidized polymer flows through fluidized polymer inlet fitting 840 into fluidized polymer inlet port 614, the regulated air and fluidized polymer mix in internal chamber 616 to form an air-fuel mixture. The air-fuel mixture flows out of output port 618 and through dispersal port 710 in air-oxidizer manifold 620.

In an embodiment, air-fuel distribution assembly 800 comprises a dispenser nozzle 860 and/or a dispenser cone 870. Dispenser cone 870 causes the air-fuel mixture, passing through dispenser nozzle 860, to spray out of the front surface of air-fuel distribution assembly 800 in a substantially conical pattern. FIG. 8E illustrates dispenser nozzle 860 in isolation, FIG. 8F illustrates dispenser cone 870 in isolation, and FIG. 8G illustrates the combination of dispenser nozzle 860 and dispenser cone 870. As illustrated, dispenser cone 870 comprises one or more, and preferably multiple (e.g., three), feet, that are configured to slide into corresponding slots 862 around an edge of an opening in dispenser nozzle 860. The opposite end of dispenser nozzle 860 is configured to fit into dispersal port 710 through the front surface of air-oxidizer manifold 620.

As the air-fuel mixture sprays out of air-fuel distribution assembly 800, oxidizing agent flows through oxidizer fitting 840 into oxidizer inlet port 724, into channel 720, through jet holes 722, and out of the front surface of air-fuel distribution assembly 800. Similarly, as the air-fuel mixture sprays out of air-fuel distribution assembly 800, air flows through the air fitting into air inlet port 734, into channel 730, through jet holes 732, and out of the front surface of air-fuel distribution assembly 800. As discussed above, jet holes 722 and 732 may be angled with respect to the longitudinal axis X, such that the oxidizing agent and air exit jet holes 722 and 732, respectively, at an angle.

1.6.4. Primary Reaction Chamber

Figure 9A:
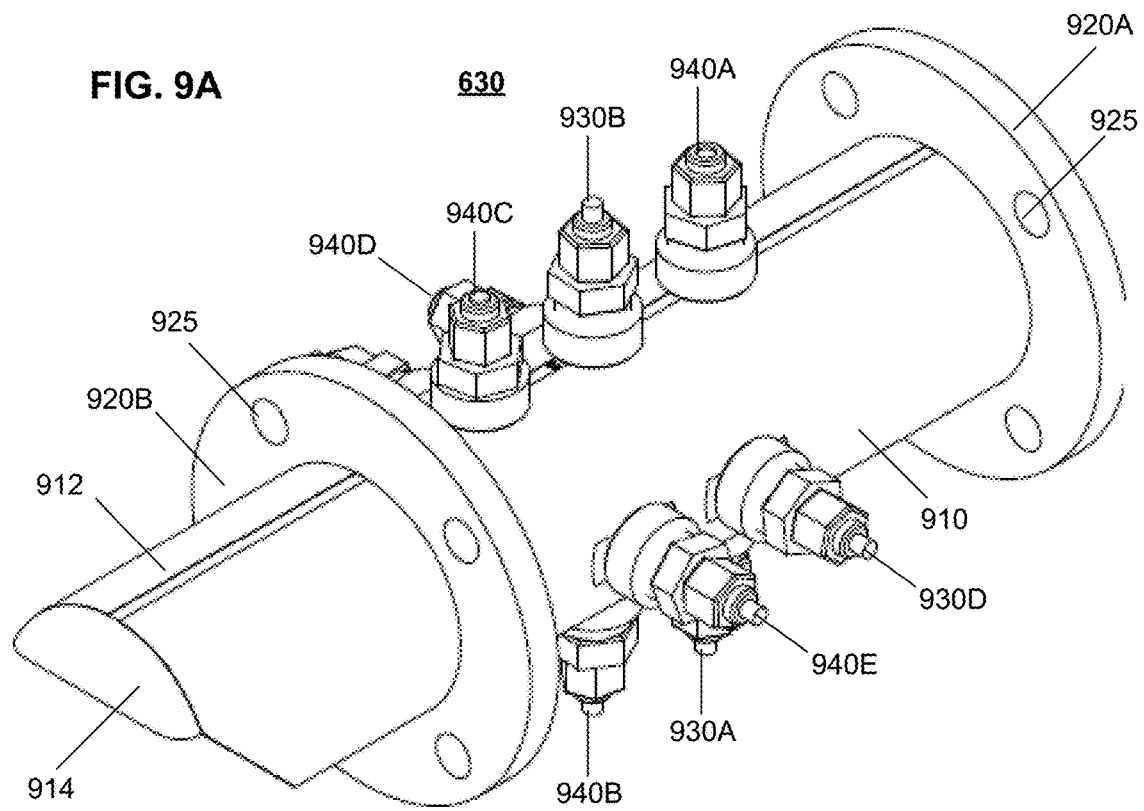
Figure 9B:
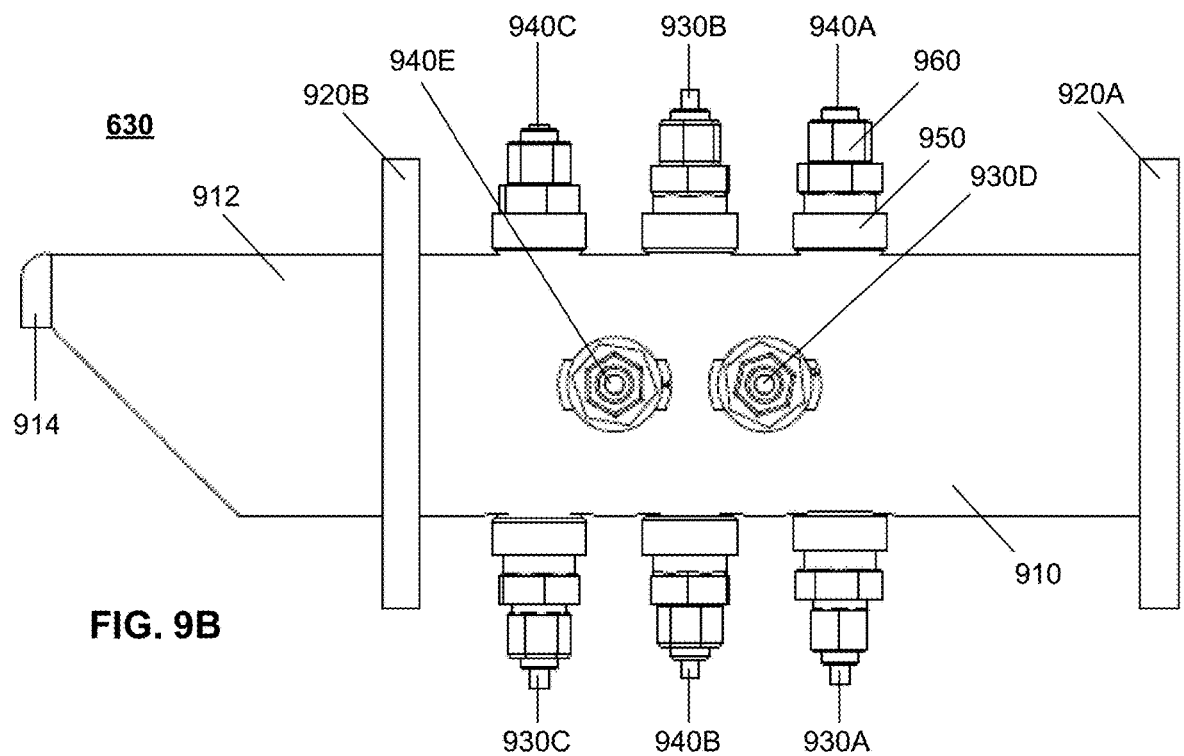

FIG. 9A illustrates primary reactor chamber 630 in a perspective view, FIG. 9B illustrated primary reactor chamber 630 in a top view, FIGS. 9C and 9D illustrate primary reactor chamber 630 in opposing side views, FIGS. 9E and 9F illustrate primary reactor chamber 630 in rear and front views, respectively, and FIG. 9G illustrates primary reactor chamber 630 in a cross-sectional top or bottom view, according to an embodiment. In the illustrated embodiments, primary reactor chamber 630 comprises a substantially cylindrical body 910 that is open on both ends, with a flange 920A on one end, and a flange 920B on the other end.

Cylindrical body 910 is substantially cylindrical, with openings on both ends. A portion 912 of cylindrical body 910 may extend beyond flange 920B, and may be sized to fit into cylindrical lip 415 in cylindrical body 410 of secondary reactor 400. Notably portion 912 may comprise an angled opening and/or a lip 914 extending over the opening. The opening may be angled at an angle θ (e.g., 45°) with respect to longitudinal axis X, as illustrated in FIG. 9G. Advantageously, this angled opening in conjunction with lip 914 can stabilize the pressure between primary reactor 600 and secondary reactor 400.

Cylindrical body 910 may comprise a plurality of holes cut, perpendicular to the longitudinal axis X, through the sides of cylindrical body 910. The plurality of holes may be cut as pairs of holes, which each hole in each pair aligned along a lateral axis extending, perpendicularly to the longitudinal axis, through opposite sides of cylindrical body 910. Each hole is fitted with an electrode support body 950 that is configured to receive an electrode, and, for each pair of holes, one hole is configured to receive a positive electrode 930 (e.g., tungsten electrode) and the other hole is configured to receive a ground electrode 940 (e.g., tungsten electrode). Each electrode 930 and 940 may be seated within a respective electrode support body 950 in its respective hole and fixed to cylindrical body 910 by a ferrule nut 960 that is threaded and tightened over electrode support body 950.

When a positive electrode 930 and ground electrode 940 are fixed within a pair of holes, they are aligned with each other along a lateral axis extending through the sides of cylindrical body 910 and intersecting longitudinal axis X at a right angle. Primary reactor chamber 630 may comprise a plurality of these electrode pairs. For example, in the illustrated embodiment, primary reactor chamber 630 comprises three electrode pairs oriented horizontally through primary reaction chamber 630 and two electrode pairs oriented vertically through primary reactor chamber 630. In other words, one subset of electrode pairs is oriented in a plane that is orthogonal to a plane in which another subset of electrode pairs is oriented. In addition, the orientation of the three horizontal electrode pairs and the two vertical electrode pairs alternate, such that no positive electrodes 930 are adjacent to each other on the same side of cylindrical body 910 and no ground electrodes 940 are adjacent to each other on the same side of cylindrical body 910. Conversely, each positive electrode 930 is adjacent to at least one ground electrode 940. Furthermore, the lateral axes, on which each pair of electrodes is aligned, are offset from each other so that they intersect the longitudinal axis X at different points, such that none of the electrode pairs intersect each other.

Flanges 920A and 920B may be, but are not necessarily, identical. Each flange 920 may comprise one or more, and preferably multiple (e.g., four or more), holes 925. Each hole 925 may be configured to receive a bolt therethrough.

Flange 920A may be adjoined to the front surface of air-oxidizer manifold 620 in air-fuel distribution assembly 800, with each hole 925 aligned to a corresponding hole 740 in air-oxidizer manifold 620 and each hole 740 aligned to a corresponding hole 825 in flange 820 of air-fuel distribution assembly 800. Flange 920A may then be fixed to air-fuel distribution assembly 800 by inserting bolts through all of the aligned holes 925, 740, and 825, and threading and tightening the bolts through corresponding nuts, to thereby fix primary reaction chamber 630 to air-fuel distribution assembly 800. Alternatively or additionally, other mechanisms may be used to fix flanges 920A and 820 to each other and/or to fix primary reaction chamber 630 and air-fuel distribution assembly 800 to each other.

Similarly, flange 920B may be adjoined to flange 430 on secondary reactor 400, with each hole 925 aligned to a corresponding hole 435 in flange 430 of secondary reactor 400. Flange 920B may then be fixed to flange 430 by inserting bolts through all of the aligned holes 925 and 435, and threading and tightening the bolts through corresponding nuts, to thereby fix primary reactor 600 to secondary reactor 400. Alternatively or additionally, other mechanisms may be used to fix flanges 920B and 430 to each other and/or to fix primary reactor 600 and secondary reactor 400 to each other.

In operation, an air-fuel mixture sprays, from dispersal port 710 of air-oxidizer manifold 620 in air-fuel distribution assembly 800, into the opening at the end of cylindrical body 910 that is opposite portion 912. In addition, an oxidizing agent and air may be jetted out of jet holes 722 and 732, respectively, of air-oxidizer manifold 620, into the same opening of cylindrical body 910.

As discussed elsewhere herein, jet holes 722 and 732 may facilitate the creation of a vortex within cylindrical body 910, which saturates the air-fuel mixture with the oxidizing agent and air. This vortex of fuel within cylindrical body 910 is ignited by the electrode pairs formed by aligned positive electrodes 930 and ground electrodes 940, as described elsewhere herein. The resulting flame through the opening in portion 912 heats the air flowing within secondary reactor 400 between blower 200 and heat exchanger 500.

1.6.5. Ignition System

Figure 10A:
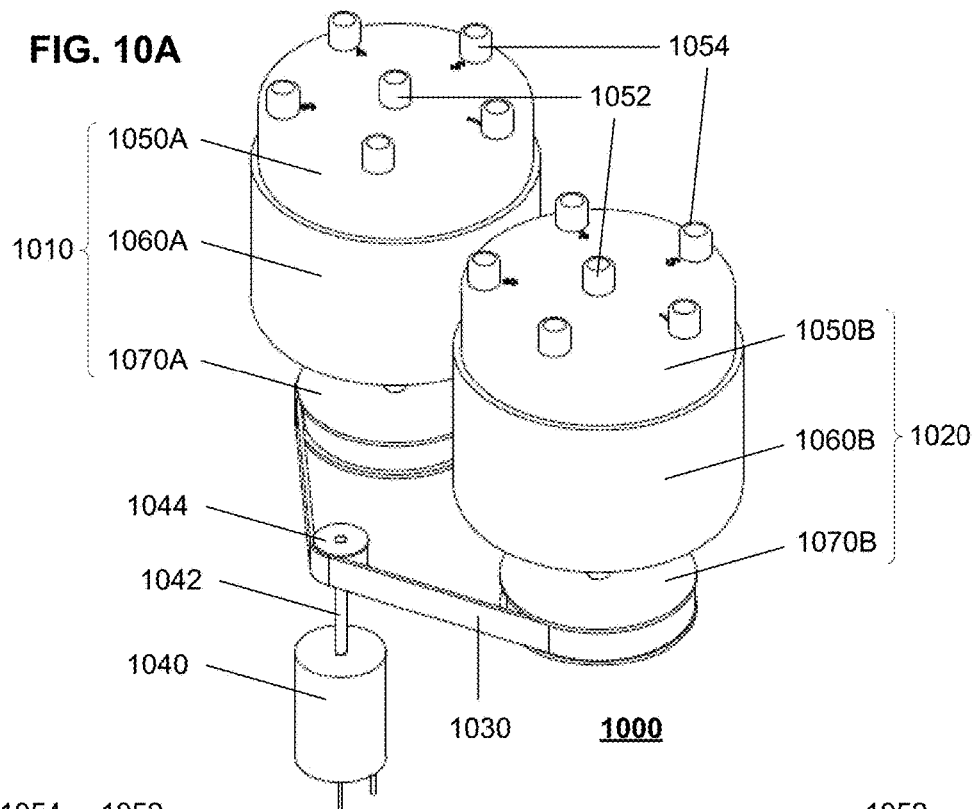
Figures 10B, 10C:
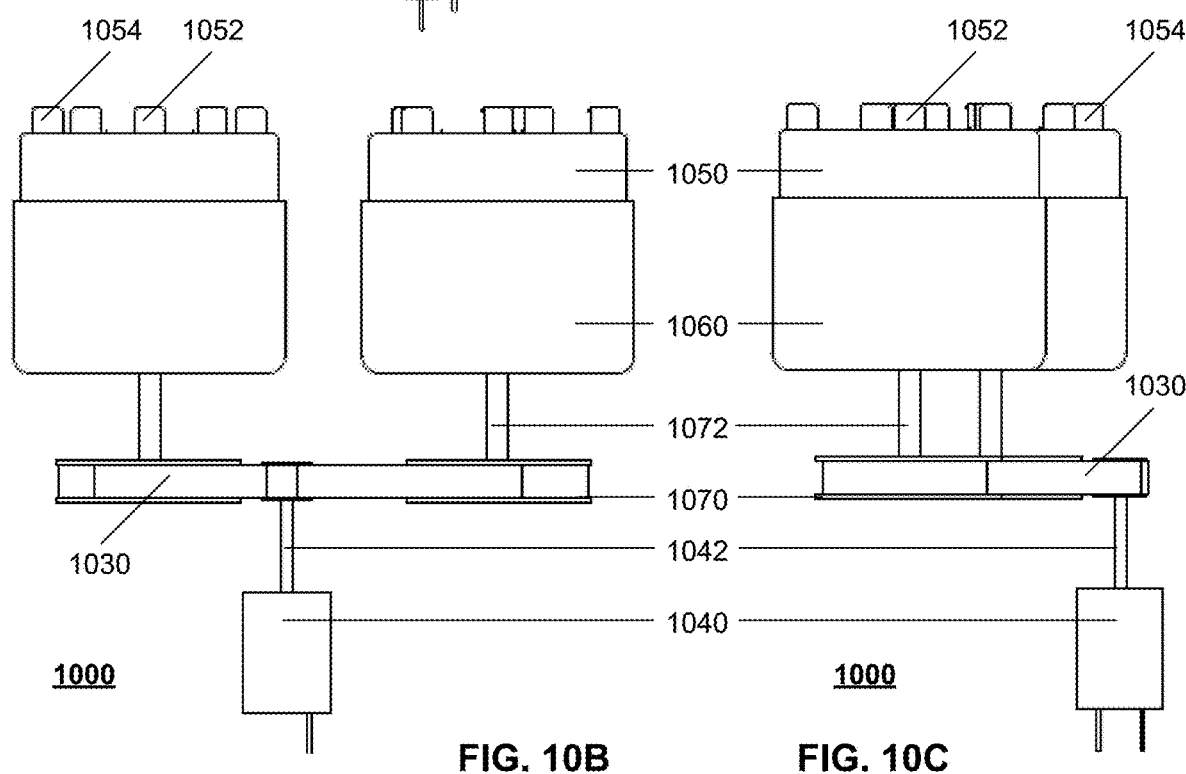

FIG. 10A illustrates a distributor system 1000 in a perspective view, FIGS. 10B and 10C illustrate distributor system 1000 in orthogonal side views, and FIGS. 10D and 10E illustrate distributor system 1000 in bottom and top views, respectively, according to an embodiment. FIG. 10E illustrates a distributor within distributor system 1000 in a cross-sectional side view, and FIG. 10F illustrates the movement within a distributor within distributor system 1000 in a phantom view, according to an embodiment. In the illustrated embodiments, distributor system 1000 comprises a high-energy spark generator 1010 and a ground distributor 1020, joined by a timing belt 1030 that is rotated by a belt hub 1044 driven by a motor 1040 via a motor shaft 1042.

High-spark energy generator 1010 and ground distributor 1020 both comprise a distributor cap 1050 on top of a distributor body 1060, and a pulley 1070 attached to a distributor shaft 1072 that spins with the pulley 1070 and extends into distributor body 1060, where it is attached to a rotor 1074. Each distributor cap 1050 comprises a central tower 1052 and a plurality of towers 1054 (e.g., five) encircling central tower 1052 and spaced equidistantly apart from each other.

As motor 1040 rotates motor shaft 1042, motor shaft 1042 rotates belt hub 1044, which rotates timing belt 1030. In turn, timing belt 1030 rotates pulleys 1070, which each rotates a respective distributor shaft 1072, which rotates distributor rotor 1074 attached to the other end of distributor shaft 1072. As illustrated in FIG. 10F, distributor rotor 1074 comprises a platform that is connected to central tower 1052 and is sized to pass under each tower 1054. Thus, as illustrated in FIG. 10G, as distributor rotor 1074 rotates, it will repeatedly pass under each tower 1054 in a sequence of tower 1054A, 1054B, 1054C, 1054D, 1054E, 1054A, and so on and so forth.

It should be understood that this rotation occurs simultaneously in both high-spark energy generator 1010 and ground distributor 1020. Thus, for example, as the distributor rotor 1074 in high-spark energy generator 1010 is underneath tower 1054A in high-spark energy generator 1010, the distributor rotor 1074 in ground distributor 1020 is also underneath tower 1054A, as the distributor rotor 1074 in high-spark energy generator 1010 is underneath tower 1054B in high-spark energy generator 1010, the distributor rotor 1074 in ground distributor 1020 is also underneath tower 1054B, and so on and so forth.

Each tower 1054 in high-spark energy generator 1010 may be electrically attached to a different one of the positive electrodes 930 in primary reactor chamber 630. Similarly, each tower 1054 in ground distributor 1020 may be electrically attached to a different one of the ground electrodes 940 in primary reactor chamber 630. In other words, there is a one-to-one correspondence between positive electrodes 930 and towers 1054 on high-spark energy generator 1010, and a one-to-one correspondence between ground electrodes 940 and towers 1054 on ground distributor 1020.

As the distributor rotor 1074 in high-spark energy generator 1010 passes underneath the tower 1054A on high-spark energy generator 1010 and the distributor rotor 1074 in ground distributor 1020 passes underneath the tower 1054A on ground distributor 1020, a spark is generated from positive electrode 930A to ground electrode 940A. This spark ignites the fuel mixture within primary reactor chamber 630. It should be understood that the same chain of events may occur for each of the corresponding towers 1054 and their connected electrode pairs 930/940.

1.6.6. Fluidizer

Figures 11A, 11B, 11C:
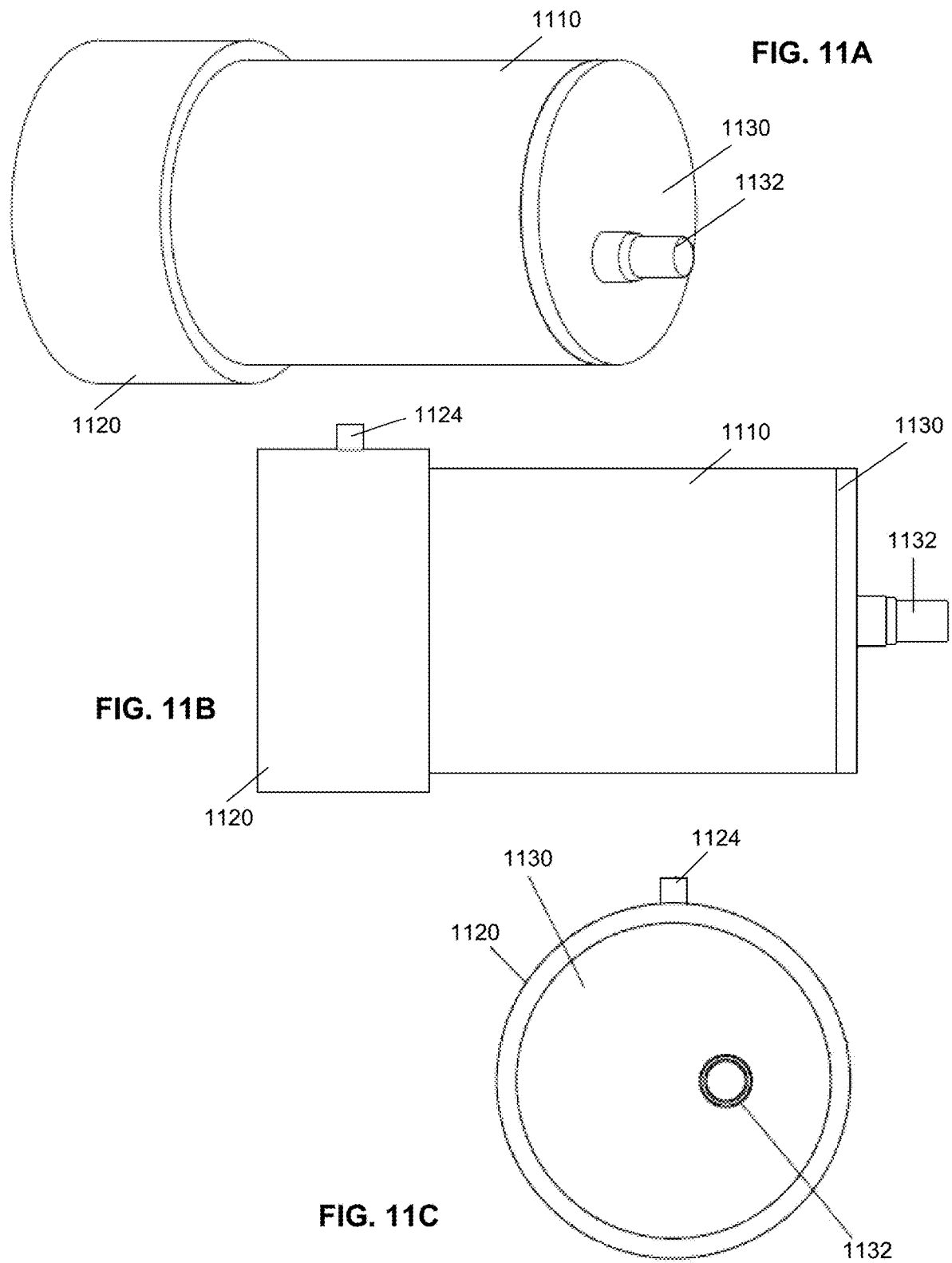
FIGS. 11A-11D illustrate various views of a fluidizer, according to an embodiment.
Figure 11D:
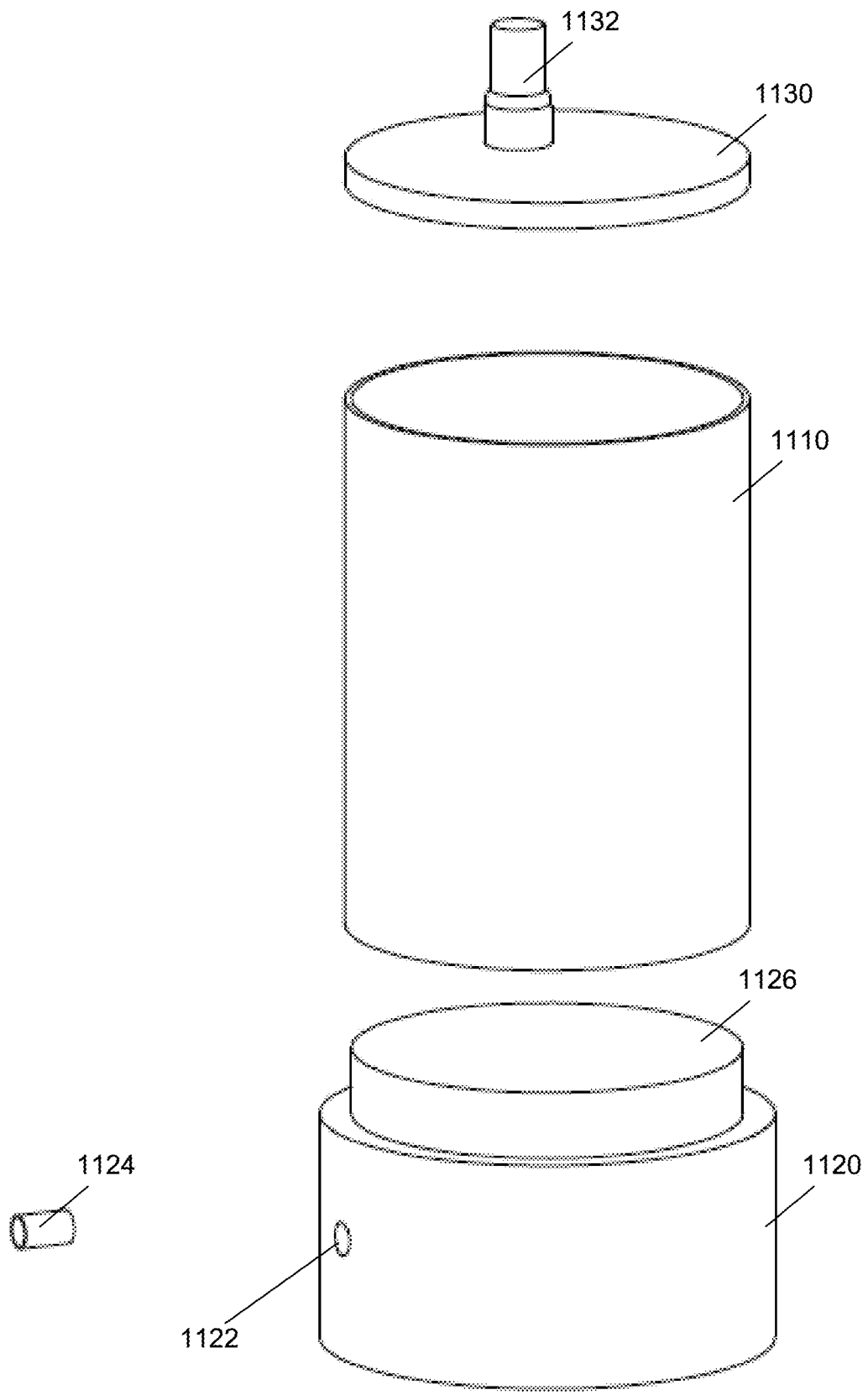
Figure 12A:
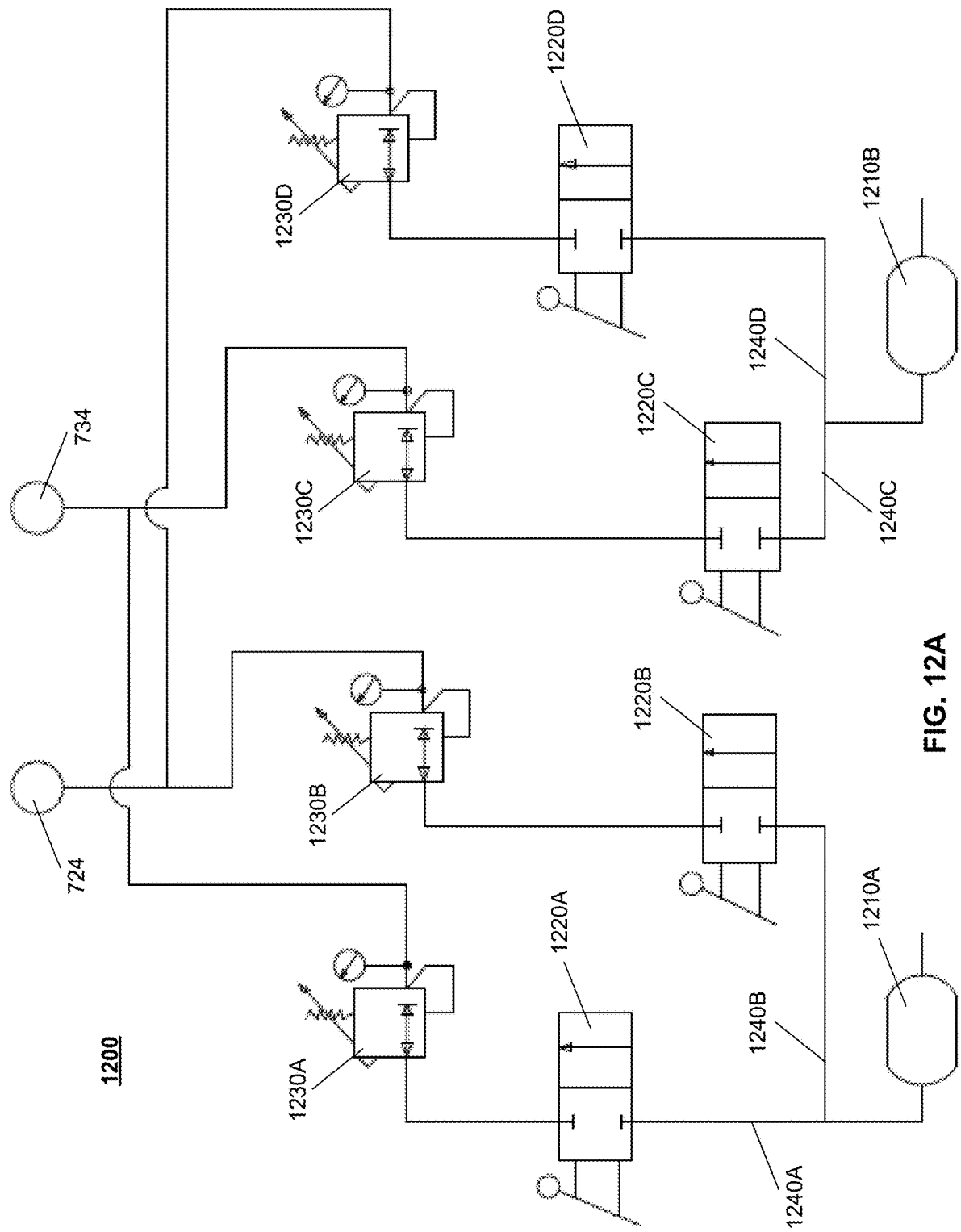
FIGS. 12A and 12B illustrate a pneumatic system, according to embodiments.
Figure 12B:
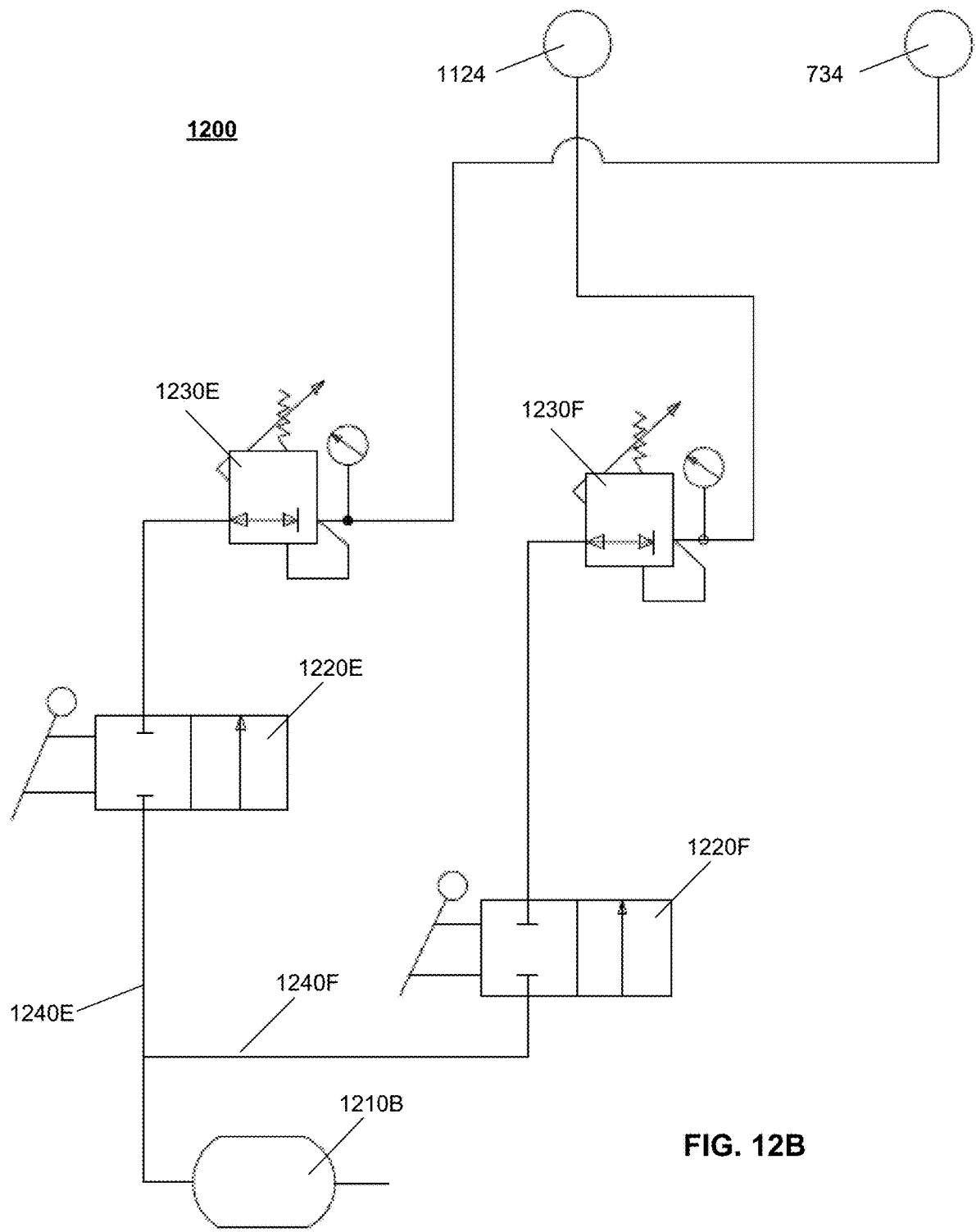

FIG. 11A illustrates a fluidizer 1100 in a perspective view, FIG. 11B illustrates fluidizer 1100 in a side view, and FIG. 11C illustrates fluidizer 1100 in a front view down a longitudinal axis of fluidizer 1100, according to an embodiment. FIG. 11D illustrates fluidizer 1100 in an exploded perspective view, according to an embodiment. In the illustrated embodiment, fluidizer 1100 comprises a substantially cylindrical body 1110, with a base 1120 on one end and a lid 1130 on the opposite end. For example, lid 1130 may be attached to one end of cylindrical body 1110, and the other end of cylindrical body 1110 may be seated (e.g., upright) on top of base 1120.

Base 1120 is substantially cylindrical, with a fitting hole 1122 (e.g., circular hole in the illustrated embodiment) cut into the side to receive air connection fitting 1124. Air connection fitting 1124 is configured to be seated within fitting hole 1122, and be releasably connected to a fluid line. Thus, an external fluid line may feed air, through air connection fitting 1124, into an interior of base 1120. Base 1120 may also comprise a porous separation membrane 1126 that is positioned between an air chamber in base 1120 and an internal cavity of cylindrical body 1110.

Cylindrical body 1110 may be substantially cylindrical, and may contain one or more layers of polymer, created by pulverizing plastic waste. For example, processed micro-fine polymers may be placed inside the internal cavity of cylindrical body 1110, partially filling the internal cavity. Air pressure inside base 1120 is forced through the pores of porous membrane 1126, and bubbles through the micro-fine polymers inside cylindrical body 1110. This bubbling action agitates the polymers inside cylindrical body 1110, causing a static charge to build up in the polymers, which, in turn, causes the polymer particles to repel each other. This creates a statically charged cloud of fluidized polymer.

Lid 1130 may comprise an exit fitting 1132. As illustrated, exit fitting 1132 may be fitted onto the front, external surface of lid 1130, to provide a pathway from the internal cavity of cylindrical body 1110 to an exterior of fluidizer 1100. In practice, the cloud of fluidized polymer in cylindrical body 1110 is forced out of exit fitting 1132 by the positive air pressure created inside cylindrical body 1110 by the air flow from base 1120 through porous membrane 1126.

In an embodiment, fluidizer 1100 is connected to fluidized polymer inlet port 614 of air-fuel mixer 610. For example, exit fitting 1132 may be connected directly to fluidized polymer inlet fitting 840 of air-fuel distribution assembly 800, or may be indirectly connected to fluidized polymer inlet fitting 840 via a line. Alternatively, exit fitting 1132 may be connected directly to or integrated with fluidized polymer inlet port 614, such that no fluidized polymer inlet fitting 840 is required.

In practice, fluidizer 1100 operates in a similar manner as a powder-coating gun, and may even comprise a powder-coating gun. Powder-coating guns are used to apply micro-fine polymer to surfaces to, for example, protect the surfaces from environmental elements. For instance, a powder-coating gun may be used to apply fine polymer powder to a surface, which is then heated by thermal energy to set the powder as a protective coating.

1.6.7. Pneumatic System

FIGS. 12A and 12B illustrate a pneumatic system 1200 that may be used to supply fluid to various components of primary reactor 600, according to an embodiment. Specifically, pneumatic sources 1210 may be connected to the various inlet ports described herein with one or more valves 1220 and/or gauges 1230 along pathways 1240. Although particular configurations are illustrated, it should be understood that pneumatic system 1200 may be implemented in different configurations. Each valve 1220 may comprise a manual or automatic valve that regulates pressure. The pneumatic pressure in each pathway 1240 is measured by a gauge 1230.

In the embodiment of pneumatic system 1200A, illustrated in FIG. 12A, a first pneumatic source 1210A is connected, via a first pathway 1240A, to air inlet port 734. In addition, the first pneumatic source 1210A is connected, via a second pathway 1240B, to oxidizer inlet port 724. A second pneumatic source 1210B is connected, via a third pathway 1240C, to air inlet port 734. In addition, the second pneumatic source 1210B is connected, via a fourth pathway 1240D, to oxidizer inlet port 724. Each of the four pathways 1240A-1240D comprises a respective valve 1220A-1220D and a respective gauge 1230A-1230D. First pneumatic source 1210A may comprise a tank of oxidizing agent (e.g., gas), whereas second pneumatic source 1210B may comprise a tank of air.

In the embodiment of pneumatic system 1200B, illustrated in FIG. 12B, a pneumatic source 1210B is connected, via a fifth pathway 1240E, to air inlet port 734. In addition, the pneumatic source 1210B is connected, via a sixth pathway 1240F, to air connection fitting 1124. Each of the two pathways 1240E and 1240F comprises a respective valve 1220E and 1220F and a respective gauge 1230E and 1230F. Pneumatic source 1210B may comprise a tank of air, to thereby supply air to air inlet port 734 and air connection fitting 1124, via pathways 1240E and 1240F, respectively.

Pneumatic systems 1200A and 1200B may be combined, such that a tank 1210A of oxidizing gas is connected to oxidizer inlet port 724 (e.g., pathway 1240B), and a tank 1210B of air is connected to air inlet port 734 via pathway 1240C, oxidizer inlet port 724 via pathway 1240D or 1240E, and air connection fitting 1124 via pathway 1230F. Thus, the air tank can supply air to oxidizer inlet port 724, for example, when a temperature within primary reactor chamber 630 exceeds a predetermined value (e.g., 600° C.).

1.6.8. Connection to Secondary Reactor

As illustrated in FIG. 1A, primary reactor 600 is connected perpendicularly to secondary reactor 400. Specifically, end portion 912 of primary reactor 600 is inserted into cylindrical lip 415, and flange 920B of primary reactor 600 is fixed (e.g., bolted) to flange 430 of secondary reactor 400, to join primary reactor 600 to secondary reactor 400. Thus, the diameter of secondary reactor 400 should be larger than the diameter of primary reactor 600, so that end portion 912 of primary reactor 600 can be accommodated within secondary reactor 400.

1.7. Catalytic Converter

In an embodiment, plastic-powered power generator 100 may include a catalytic converter to reduce toxic gas and pollutants in the exhaust of plastic-powered power generator 100. FIG. 13A illustrates a catalytic converter 1300 in a perspective view, FIG. 13B illustrates catalytic converter 1300 in a side view, and FIG. 13C illustrates catalytic converter 1300 in a front or rear view down the longitudinal axis of catalytic converter 1300, according to an embodiment. In the illustrated embodiment, catalytic converter 1300 comprises a substantially cylindrical body 1310 that is open on both ends, with a flange 1320A on one end, and a flange 1320B on the other end.

Cylindrical body 410 is substantially cylindrical, with openings on both ends, to provide a pathway for emissions through catalytic converter 1300. As illustrated, cylindrical body 410 may have slightly conical sections on either end, sandwiched between a cylindrical central section, and cylindrical end sections on which flanges 1320 are mounted or integral. Emissions enter catalytic converter 1300, through an opening in one end of catalytic converter 1300 (e.g., the opening encircled by flange 1320A), and are cleaned by catalyzing a redox reaction. This catalytic conversion can be performed in any known manner. In an embodiment, catalytic converter 1300 is a multi-phasic catalytic converter.

Flanges 1320A and 1320B may be, but are not necessarily, identical. Each flange 1320 may comprise one or more, and preferably multiple (e.g., four or more), holes 1325. Each hole 1325 may be configured to receive a bolt therethrough. Specifically, flange 1320A may be adjoined to flange 520B of heat exchanger 500, with each hole 1325 aligned to a corresponding hole 525 in flange 520B. Flange 1320A may then be fixed to flange 520B by inserting bolts through all of the aligned holes 525 and 1325, and threading and tightening the bolts through corresponding nuts, to thereby fix catalytic converter 1300 to heat exchanger 500. Alternatively or additionally, other mechanisms may be used to fix flanges 1320A and 520B to each other and/or to fix catalytic converter 1300 and heat exchanger 500 to each other.

1.8. Rankine Cycle

Figure 14:
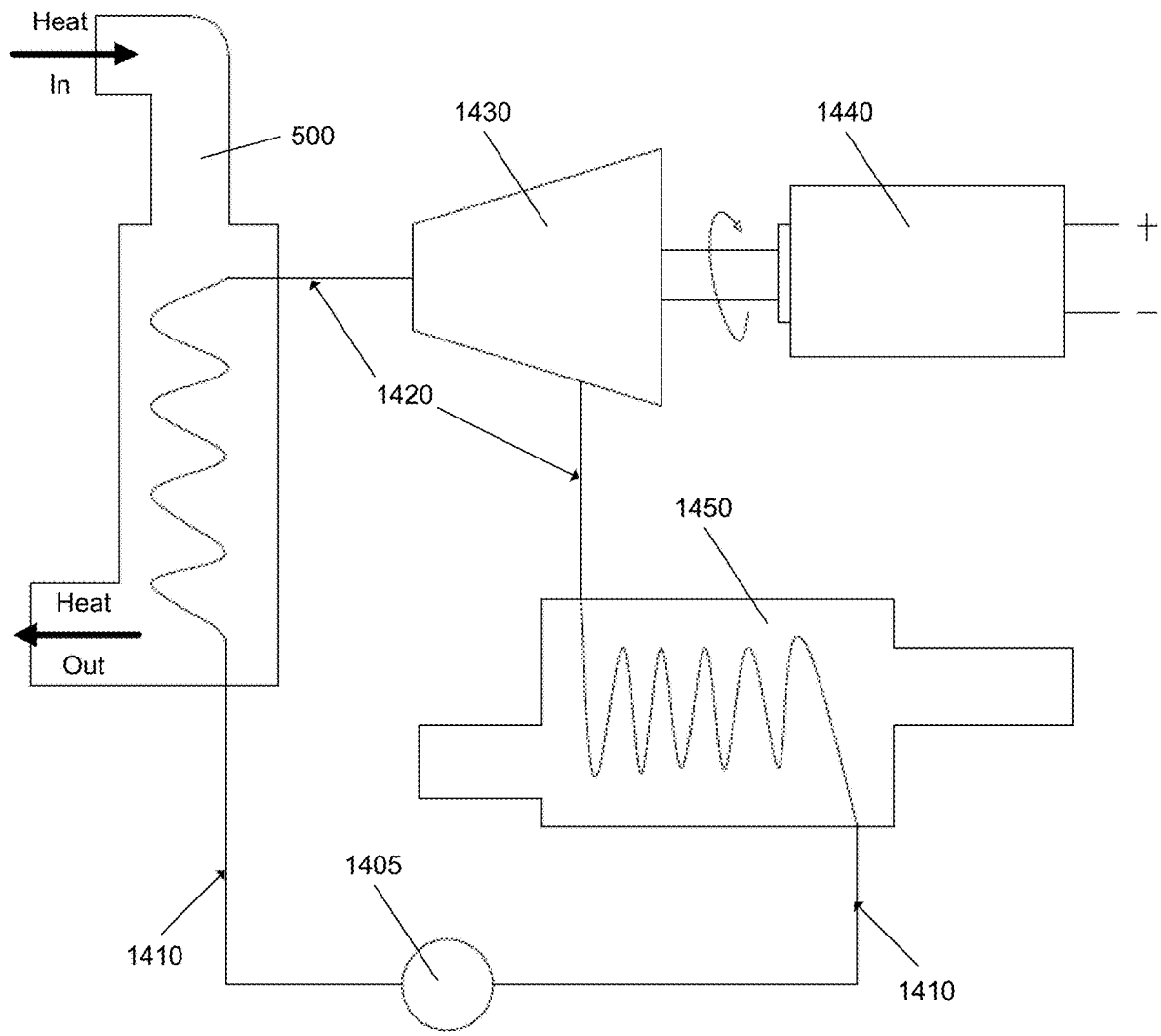
FIG. 14 illustrates a Rankine cycle, according to an embodiment.

FIG. 14 illustrates the Rankine cycle for power generation using plastic-powered power generator 100, according to an embodiment. As illustrated, heat exchanger 500 uses heated air from secondary reactor 400 to convert water 1410 into steam 1420. For instance, water may be pumped by pump 1405 into connector fitting 530A. The water may flow through a coil, comprising a high-pressure water line, within heat exchanger 500, and exit heat exchanger 500 as steam via a steam pressure line connected to connector fitting 530B.

Steam 1420 from the steam pressure line turns turbine 1430, which spins electrical generator 1440 to produce Direct Current (DC) power. Left-over steam 1420 then exits the turbine through a steam pressure line, and enters a water-cooling heat exchanger 1450, that cools steam 1420 back into water 1410. Heat exchanger 1450 may utilize a flow of cool air to cool steam 1420 back into water 1410. Essentially, heat exchanger 1450 is the reverse of heat exchanger 500, which uses hot air to convert water 1410 into steam 1420. Water-cooling heat exchanger 1450 may be used as a source of clean heat, for example, to operate a heat pump.

Water 1410 flows out of a water line attached to heat exchanger 1450 and is pumped by pump 1405 back into heat exchanger 500. It should be understood that this cycle of converting water to steam and steam to water may be maintained continuously, in a closed-loop system, to rotate electrical generator 1440 for as long as plastic-powered power generator 100 is supplied with plastic waste.

1.9. Electrical System

Figure 15:
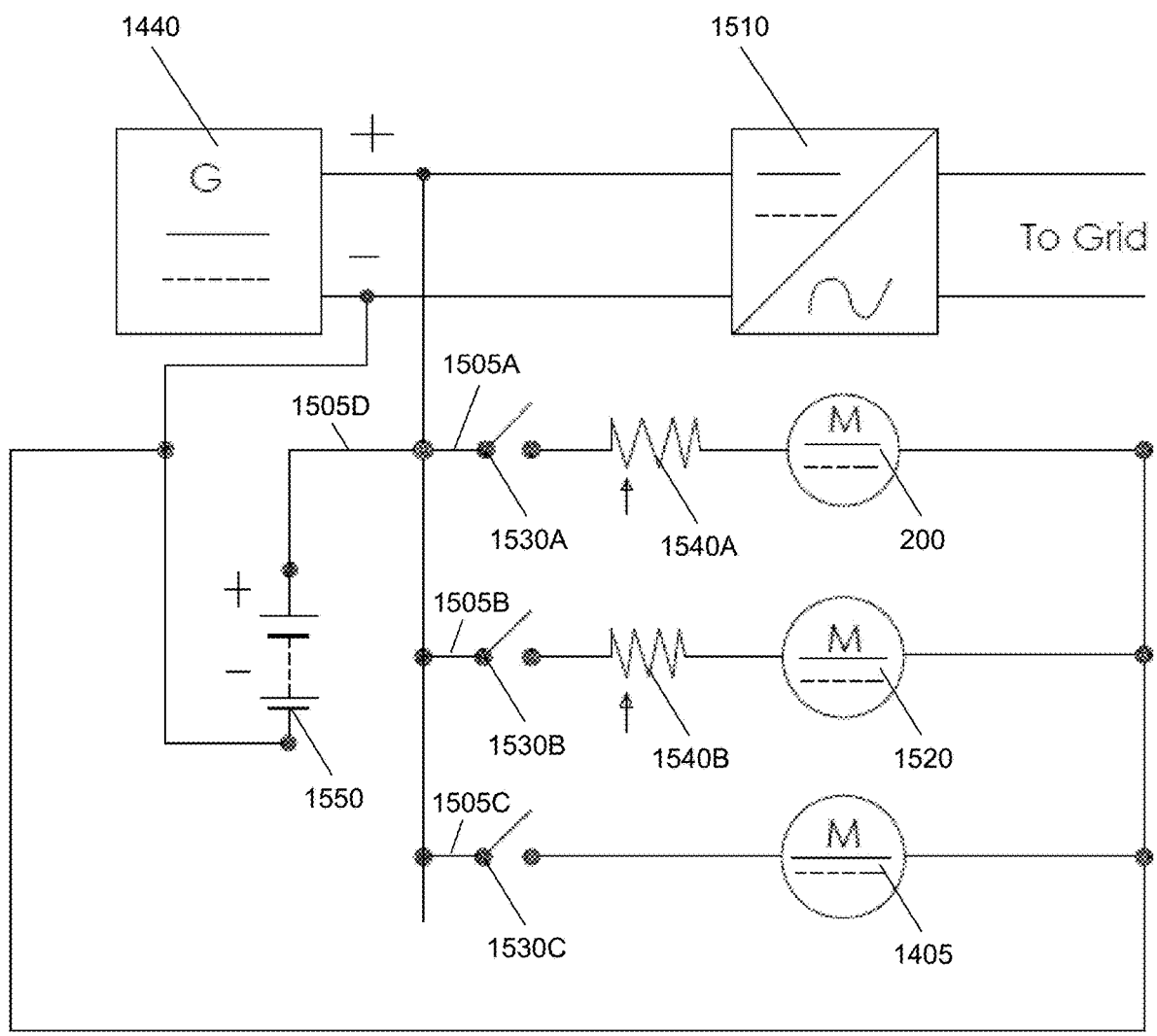
FIG. 15 illustrates an electrical system, according to an embodiment.

FIG. 15 illustrates an electrical system of plastic-powered power generator 100. Electrical generator 1440 supplies DC power to an inverter 1510, which converts the DC power to Alternating Current (AC) power before the power is supplied to the grid. Inverter 1510 may also convert AC power from the grid into DC power.

DC power from electrical generator 1440 and/or from DC-to-AC inverter 1510 is supplied to various components of plastic-powered power generator 100. For example, the DC power may be supplied to blower 200 via an electrical path 1505A, an ignition system 1520 via an electrical path 1505B, and pump 1405 via an electrical path 1505C. Ignition system 1520 may comprise distributor system 1000, and the power may drive motor 1040 of distributor system 1000. Electrical path 1505A may comprise a switch 1530A and potentiometer 1540A. When switch 1530A is closed, variable power can be supplied through potentiometer 1540A to blower 200 (i.e., blower 200 is on to force air into secondary reactor 400 through reducer 300), and when switch 1530A is open, no power is supplied to blower 200 (i.e., blower 200 is off). Similarly, electrical path 1505B may comprise a switch 1530B and potentiometer 1540B. When switch 1530B is closed, variable power can be supplied through potentiometer 1540B to ignition system 1520 (i.e., ignition system 1520 is on to ignite primary reactor 600), and when switch 1530B is open, no power is supplied to ignition system 1520 (i.e., ignition system 1520 is off). In addition, electrical path 1505C may comprise a switch 1530C. When switch 1530C is closed, power is supplied to pump 1405 (i.e., pump 1405 is on to pump water 1410 into heat exchanger 500), and when switch 1530C is open, no power is supplied to pump 1405 (i.e., pump 1405 is off). Each switch 1530 may comprise a Single Pole Single Throw (SPST) switch.

In addition, the DC power may be supplied to a battery 1550 via an electrical path 1505D. Battery 1550 may comprise a multi-cell battery. Battery 1150 can be used to store electrical energy from electrical generator 1440 and/or the grid (e.g., via inverter 1510), and may power blower 200, ignition system 1520, and/or pump 1405 (e.g., when electrical generator 1440 is not generating power, or when electrical generator 1440 is not generating sufficient power to power the entire system).

1.10. Variations

The embodiments described herein are merely given as examples. Thus, it should be understood that the described embodiments do not limit the invention. An embodiment does not have to contain all of the components described herein. Rather, a particular embodiment may comprise a subset of the components described herein.

In addition, each of the components described or implied herein may be implemented in a variety of manners, including in a manner that is different than disclosed herein. For example, any of the various flanges described herein may integral with a component (e.g., formed as one piece with the component), or manufactured separately and seated and fixed to a component (e.g., welded, adhered, threaded, etc.). In addition, the various bolt holes described herein may all be identical, or alternatively, a subset of the bolt holes may be different than another subset of the bolt holes. However, it would generally be more efficient for all of the bolt holes to be identical, since the same bolts could be used for every bolt hole.

2. Process

Figure 16:
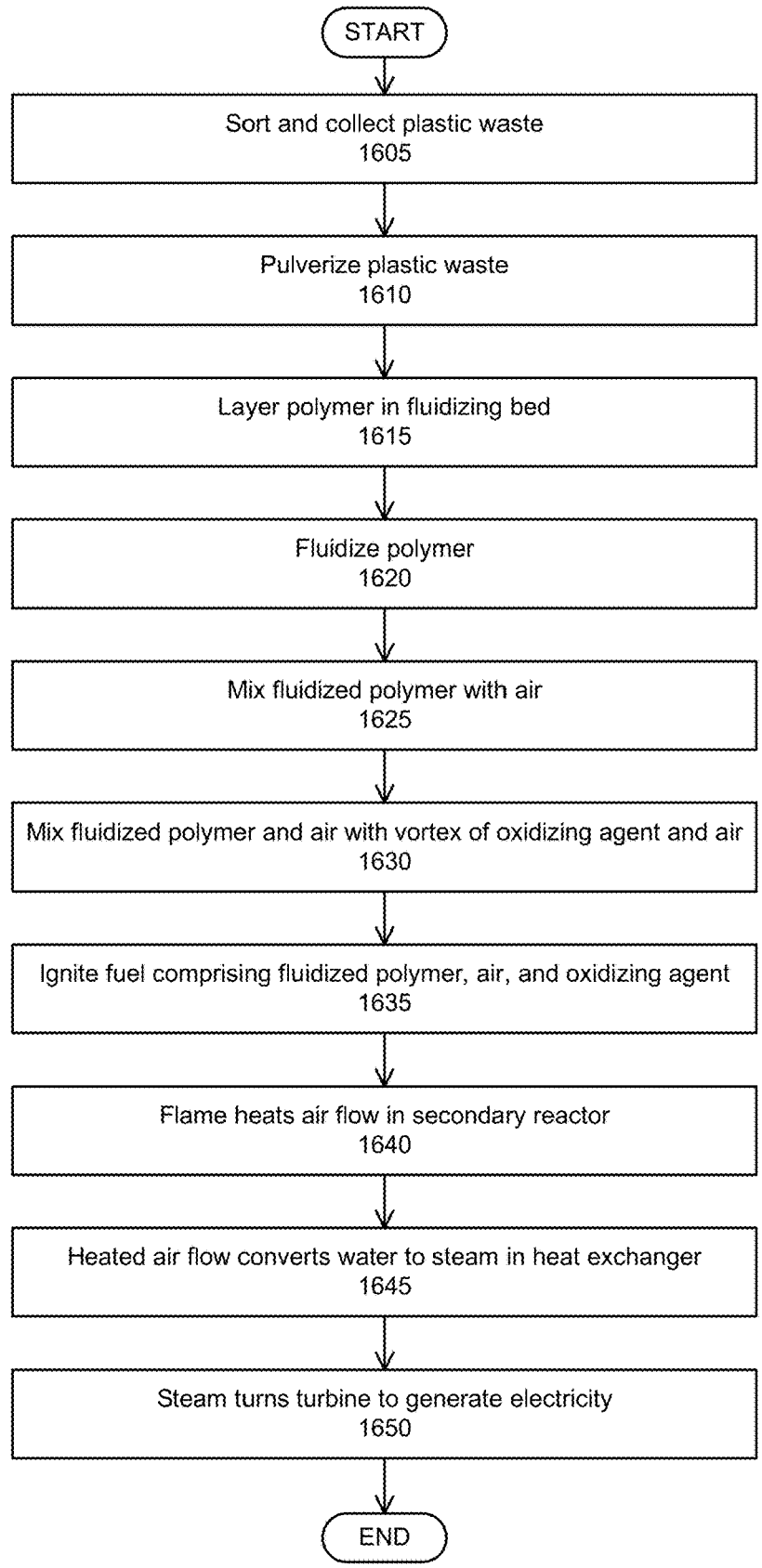
FIG. 16 illustrates a process for converting plastic waste into electrical power using a plastic-powered power generator, according to an embodiment.

FIG. 16 illustrates the usage and operation of plastic-powered power generator 100, according to an embodiment. While the process is illustrated with a certain arrangement and ordering of steps, the process may be implemented with fewer, more, or different steps, and a different arrangement and/or ordering of steps. In addition, it should be understood that any step, which does not depend on the completion of another step, may be executed before, after, or in parallel with that other independent step, even if the steps are described or illustrated in a particular order.

Initially, in step 1605, waste products, including plastic waste, are sorted and collected. Then, in step 1610, the sorted and collected plastic waste is pulverized. This pulverization may comprise a shredding step, followed by a pelletizing step. Specifically, the plastic waste may firstly be passed through a shredding device that reduces the plastic waste to objects ranging in size from 2,000 to 3,000 microns. Then, this shredded plastic waste may secondly be passed through a pulverizing device that further reduces the plastic waste to pellets ranging in size from 0.5 to 100 microns, i.e., micron or sub-micron size.

In step 1615, the pulverized plastic waste pellets may be powder coated as a layer of polymer in a fluidizing bed, such as cylindrical body 1110 of fluidizer 1100. Then, in step 1620, air pressure, supplied by air connection fitting 1124 into base 1120, passes through porous separation membrane 1126, and agitates the layer of polymer in cylindrical body 1110, thereby inducing a positive static charge. The static charge facilitates the polymer molecules in repelling each other, forming a cloud of fluidized polymer molecules within cylindrical body 1110.

In step 1625, a line fitted to air inlet fitting 830 supplies regulated air, through air inlet port 612, into internal chamber 616. The air, input to air-fuel distribution assembly 800, may be pressurized to approximately 1 to 10 pound-force per square inch (psi). The pressure of the air flow through internal chamber 616 creates a vacuum of low pressure, which pressurizes fluidized polymer inlet port 614. Simultaneously, fluidized polymer molecules flow, through exit fitting 1132 in fluidizer 1100, which is connected, directly or indirectly, to fluidized polymer inlet fitting 740 in air-fuel distribution assembly 800, through fluidized polymer inlet port 614, and into internal chamber 616.

In step 1630, the pressurized fluidized polymer flows through internal chamber 616, through output port 618, through dispersal port 710, and sprays out of dispenser nozzle 860 (e.g., spreading in a substantially conical spray pattern, caused by dispenser cone 870) at the center of air-oxidizer manifold 620. As the pressurized fluidized polymer sprays into primary reactor chamber 630, simultaneously, oxidizing agent jets (e.g., at an angle) out of jet holes 722, and air jets (e.g., at an angle) out of jet holes 732, into primary reactor chamber 630. As discussed elsewhere herein, jet holes 722 and 732 may be angled to facilitate the rotation of the fluids exiting from jet holes 722 and 732. Thus, as oxidizing agent and air flow into primary reactor chamber 630 from jet holes 722 and 732, they create a vortex which saturates the pressurized fluidized polymer, spraying from dispenser nozzle 860, with the oxidizing agent and air. The vortex enhances thermo-energy and reliability within primary reactor chamber 630. At this point, the pressurized fluidized polymer, mixed with air and oxidizing agent, can be referred to as "fuel." In a preferred embodiment, the oxidizing agent is gaseous oxygen. However, other oxidizing agents may be used, including, a mixture of oxygen and some other gas, ozone, and the like.

In step 1635, the fuel is ignited within primary reactor chamber 630. As described elsewhere herein, each positive electrode 930 is aligned with exactly one ground electrode 940 along a lateral axis of primary reactor chamber 630, and these pairs of positive and ground electrodes 930/940 are aligned along different lateral axes from each other, along and around a longitudinal axis X of primary reactor chamber 630. In an embodiment, a plurality of electrode pairs may be aligned along lateral axes that are perpendicular to the lateral axes along which a different plurality of electrode pairs are aligned.

The ground electrode 940 in each electrode pair acts as a grounding field that attracts the fuel entering primary reactor chamber 630 from air-fuel distribution assembly 800. Specifically, as discussed elsewhere herein, the fluidized polymer is statically charged. Thus, the particles of fluidized polymer seek a grounding point in order to discharge. In an embodiment, to facilitate this attraction between the fuel and ground electrodes 940, primary reactor chamber 630 is dielectric (e.g., formed from or coated with ceramic materials), such that the interior walls of primary reactor chamber 630 do not attract the charged particles of fluidized polymer. Instead, the charged particles of fluidized polymer are attracted to the currently grounded ground electrode 940 (e.g., which are grounded in sequence as discussed elsewhere herein). Thus, the grounding of each ground electrode 940 provides a dual purpose: (1) a ground for the spark from the corresponding positive electrode 930, as generated by high-spark energy generator 1010; and (2) a ground for the statically charged particles of fluidized polymer.

As the fuel exits air-fuel distribution assembly 800 and is propelled towards a ground electrode 940, the paired positive electrode 930 creates a spark towards the ground electrode 940, which ignites the fuel. For example, as described elsewhere herein, distributor system 1000 may rotate a distributor rotor 1074 in each of a pair of high-spark energy generator 1010 and ground distributor 1020, to provide a spark through electrode pairs in sequence. Thus, each of the electrode pairs, each comprising an aligned positive electrode 930 and ground electrode 940, fire in sequence, as described elsewhere herein, to ignite the fuel in primary reactor chamber 630.

In an embodiment, when the operating temperature within primary reactor chamber 630 reaches a predetermined threshold value, the oxidizing agent being jetted from jet holes 722 may be replaced with compressed air or a mixture of compressed air and oxidizing agent, via pneumatic system 1200. The predetermined threshold value may be 600° Celsius. At this temperature, the reaction no longer requires the oxidizing agent, but continues to require air. It should be understood that, during the ignition in step 1635, assuming that tank 1210A holds the oxidizing agent (e.g., gas) and tank 1210B holds compressed air, normally, valve 1220A should be off, valve 1220B should be on, valve 1220C should be on, and valve 1220D should be off. Referring to FIG. 12A, to replace the oxidizing agent with compressed air, valve 1220B may be shut off to prevent oxidizing agent from tank 1210A from flowing to oxidizer inlet port 724, and valve 1220D may be turned on to allow compressed air from tank 1210B to flow to oxidizer inlet port 724. To replace the oxidizing agent with a mixture of compressed air and oxidizing agent, valve 1220B may be turned down, and valve 1220D may be turned up, to create a mixture of oxidizing agent and compressed air at oxidizer inlet port 724. Primary reactor chamber may comprise a temperature sensor, and a control device that monitors the output of the temperature sensor (e.g., a value representing the temperature within primary reactor chamber 630), and, when the monitored temperature value exceeds the predetermined threshold value, automatically controls valves 1220 (e.g., as described above) to replace the flow of oxidizing agent with air or some mixture of oxidizing agent and air (or simply turn of the flow of oxidizing agent).

In step 1640, the flame front, created by the ignited fuel in primary reactor chamber 630, heats the air in secondary reactor 400 via the opening in end portion 912, which intrudes perpendicularly into secondary reactor 400. Specifically, blower 200 pushes air through secondary reactor 400 along an axis that is orthogonal to the longitudinal axis X of primary reactor 600. Heated air exits primary reactor chamber 630, rotationally in a vortex, and creates a low-pressure area at the junction of secondary reactor 400 and primary reactor 600. This low-pressure area draws the flame from primary reactor chamber 630 into the air flow passing through secondary reactor 400 from blower 200. In other words, the air flow from blower 200 mixes with the flame from primary reactor chamber 630, inside secondary reactor 400, thereby increasing the temperature and speed of the flame. In other words, the air flow from blower 200 increases the thermal output of primary reactor 600, thereby improving the overall efficiency of plastic-powered power generator 100.

In step 1645, the heated air and/or flame front from secondary reactor 400 flows into heat exchanger 500, where it heats water 1410, in the fluid flowing within the coil in heat exchanger 500, to create steam 1420. Specifically, aqueous fluid flowing into the coil through connector fitting 530A is heated within the coil to create steam and increased pressure. The pressure pushes the steam out of connector fitting 530B. In addition, the heated exhaust gas may flow from heat exchanger 500 into catalytic converter 1300, which removes pollutants from the exhaust gas prior to emitting the exhaust gas from plastic-powered power generator 100 (e.g., into the environment, or to be used as heat for another device and/or process).

In step 1650, the steam output from connector fitting 530B passes through a turbine 1430, causing turbine 1430 to spin. In other words, the thermal energy from heat exchanger 500 is used to drive turbine 1430. The spinning turbine 1430 rotates electrical generator 1440 to produce electrical power. It should be understood that steps 1615-1650 may operate continuously, for as long as plastic-powered power generator 100 is supplied with polymer, to produce a continuous supply of electrical power.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A plastic-powered power generator comprising:
    a primary reactor comprising an air-fuel distribution assembly, an ignition system, and a primary reactor chamber, wherein the primary reactor chamber comprises a first opening on one end of the primary reactor chamber and a second opening on a second end of the primary reactor chamber, wherein the air-fuel distribution assembly is configured to supply fluidized polymer, air, and an oxidizing agent through the first opening in the primary reactor chamber, and wherein the ignition system is configured to ignite a mixture of the fluidized polymer, air, and oxidizing agent within the primary reactor chamber;
    a secondary reactor comprising a secondary reactor body with a first opening on one end of the secondary reactor body, a second opening on a second end of the secondary reactor body, and a third opening on a side of the secondary reactor body, wherein the second end of the primary reactor chamber extends perpendicularly through the third opening in the side of the secondary reactor body, such that the second opening of the primary reactor chamber is within the secondary reactor body;
    a heat exchanger comprising a first opening on one end of the heat exchanger, a second opening on a second end of the heat exchanger, and a coil, configured to contain fluid, between the first opening and the second opening, wherein the first opening of the heat exchanger is connected to the second opening of the secondary reactor; and
    a blower configured to create air flow through the secondary reactor into the heat exchanger, such that the air flow is heated in the secondary reactor through the second opening of the primary reactor, and the heated air flow from the secondary reactor heats the coil in the heat exchanger, and
    wherein the plastic-powered generator is configured to create thermal energy to generate power.

2. The plastic-powered power generator of claim 1, further comprising a reducer positioned between the blower and the secondary reactor, wherein the reducer is configured to speed up the air flow into the secondary reactor.

3. The plastic-powered power generator of claim 1, wherein the second opening of the primary reactor chamber is angled with respect to a longitudinal axis of the primary reactor chamber, such that the second end of the primary reactor chamber extends farther into the secondary reactor at a side nearer the blower than at a side farther from the blower.

4. The plastic-powered power generator of claim 3, wherein the second end of the primary reactor chamber comprises a lip which extends over a portion of the second opening of the primary reactor chamber.

5. The plastic-powered power generator of claim 1, wherein the air-fuel distribution assembly comprises an air-oxidizer manifold that comprises:
    a dispersal port comprising a channel from a rear surface of the air-oxidizer manifold to a front surface of the air-oxidizer manifold, wherein the front surface of the air-oxidizer manifold faces the first opening in the primary reactor chamber;
    at least one concentric channel, surrounding the dispersal port, recessed into the rear surface of the air-oxidizer manifold;
    at least one inlet port through a side surface of the air-oxidizer manifold and connected to the at least one concentric channel; and
    one or more jet holes extending through the air-oxidizer manifold from a recessed surface of the at least one concentric channel to the front surface of the air-oxidizer manifold.

6. The plastic-powered power generator of claim 5, wherein the one or more jet holes are angled with respect to a longitudinal axis of the air-oxidizer manifold.

7. The plastic-powered power generator of claim 5, wherein the at least one concentric channel comprises two or more concentric channels, wherein the at least one inlet port comprises two or more inlet ports that are each connected to one of the two or more concentric channels, and wherein the one or more jet holes comprise a plurality of jet holes.

8. The plastic-powered power generator of claim 7, wherein one of the two or more concentric channels is recessed deeper into the rear surface of the air-oxidizer manifold than a second one of the two or more concentric channels.

9. The plastic-powered power generator of claim 7, further comprising a pneumatic system that is configured to supply air through a first one of the two or more inlet ports, and supply an oxidizing agent through a second one of the two or more inlet ports.

10. The plastic-powered power generator of claim 9, wherein the pneumatic system is further configured to supply the air through the second inlet port.

11. The plastic-powered power generator of claim 10, wherein the pneumatic system is configured to:
monitor a temperature in the primary reactor chamber;
while the temperature remains below a predetermined threshold, supply the air through the first inlet port, and supply the oxidizing agent through the second inlet port; and,
when the temperature exceeds the predetermined threshold, supply the air through both the first inlet port and the second inlet port, and reduce or stop the supply of the oxidizing agent through the second inlet port.

12. The plastic-powered power generator of claim 5, wherein the air-fuel distribution assembly further comprises an air-fuel mixer that is attached to the rear surface of the air-oxidizer manifold, wherein the air-fuel mixer comprises:
an internal chamber;
a fluidized polymer outlet port connecting the internal chamber to the dispersal port in the air-oxidizer manifold;
an air inlet port configured to supply air flow through the internal chamber; and
a fluidized polymer inlet port configured to supply fluidized polymer to the internal chamber.

13. The plastic-powered power generator of claim 12, further comprising a fluidizer that comprises:
a body comprising a first opening in a first end and a second opening in a second end, wherein the body is configured to house one or more layers of polymer;
a base that covers the first opening in the body, wherein the base comprises an internal cavity, an air inlet port configured to receive air, and a porous membrane between the internal cavity and the first opening in the body; and
a lid that covers the second opening in the body, wherein the lid comprises a fluidized polymer outlet port that is connected to the fluidized polymer inlet port of the air-fuel mixer, so as to provide fluidized polymer to the air-fuel mixer through the connected fluidized polymer outlet and inlet ports.

14. The plastic-powered power generator of claim 1, wherein the ignition system comprises one or more electrode pairs, wherein each of the one or more electrode pairs comprises a positive electrode aligned, through the primary reactor chamber, with a ground electrode.

15. The plastic-powered power generator of claim 14, wherein the one or more electrode pairs comprise a plurality of electrode pairs, and wherein the plurality of electrode pairs alternate in orientation, such that no positive electrode is adjacent to another positive electrode and no ground electrode is adjacent to another ground electrode.

16. The plastic-powered power generator of claim 15, wherein the plurality of electrode pairs comprise two or more electrode pairs that are oriented in a plane that is orthogonal to a plane in which two or more other electrode pairs are oriented.

17. The plastic-powered power generator of claim 15, further comprising a distributor system that comprises:
a high-spark energy generator and a ground distributor, wherein each of the high-spark energy generator and the ground distributor comprises
a distributor cap comprising a plurality of towers arranged around a circumference of the distributor cap, wherein each of the plurality of towers on the distributor cap of the high-spark energy generator is electrically connected to a positive electrode in one of the plurality of electrode pairs, and wherein each of the plurality of towers on the distributor cap of the ground distributor is electrically connected to a ground electrode in one of the plurality of electrode pairs, and
a pulley connected to a rotor by a shaft, such that, when the pulley rotates, the rotor passes underneath each of the plurality of towers in a sequence; and
a motor that drives a timing belt to rotate the pulleys of the high-spark energy generator and the ground distributor, such that, as the rotor of the high-spark energy generator passes underneath a tower on the distributor cap of the high-spark energy generator, the rotor of the ground distributor simultaneously passes underneath a corresponding tower on the distributor cap of the ground distributor, so as to create a spark from the positive electrode that is electrically connected to the tower on the distributor cap of the high-spark energy generator to the ground electrode that is electrically connected to the corresponding tower on the distributor cap of the ground distributor.

18. The plastic-powered power generator of claim 1, wherein the heat exchanger is configured to receive an aqueous fluid into the coil and output steam, resulting from heating the coil, through a steam line connected to the coil, and wherein the plastic-powered power generator further comprises:
an electrical generator; and
a turbine configured to spin the electrical generator as the steam passes through the turbine, so as to produce electrical power from the electrical generator.

19. A method comprising:
pulverizing plastic waste to create sub-micron-scale polymer;
fluidizing the polymer; and
using the plastic-powered power generator of claim 18 by
supplying the fluidized polymer, air, and an oxidizing agent to the primary reactor,
supplying the aqueous fluid to the coil within the heat exchanger,
igniting the mixture of the fluidized polymer, air, and oxidizing agent within the primary reactor chamber using the ignition system, and
operating the blower to create air flow through the secondary reactor into the heat exchanger, to convert the aqueous fluid into steam that spins the turbine which spins the electrical generator to produce electrical power.

20. The method of claim 19, wherein pulverizing the plastic waste comprises:
   shredding the plastic waste into micron-scale plastic waste; and
   pelletizing the shredded micron-scale plastic waste into the sub-micron-scale polymer.

* * * * *